United States Patent
Youn et al.

(10) Patent No.: US 11,184,808 B2
(45) Date of Patent: Nov. 23, 2021

(54) METHOD FOR INTERWORKING BETWEEN NETWORKS IN WIRELESS COMMUNICATION SYSTEM AND APPARATUS THEREOF

(71) Applicant: LG Electronics Inc., Seoul (KR)

(72) Inventors: Myungjune Youn, Seoul (KR); Hyunsook Kim, Seoul (KR); Laeyoung Kim, Seoul (KR); Jinsook Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 16/690,732

(22) Filed: Nov. 21, 2019

(65) Prior Publication Data

US 2020/0092758 A1    Mar. 19, 2020

Related U.S. Application Data

(63) Continuation of application No. 16/064,732, filed as application No. PCT/KR2018/000440 on Jan. 9, 2018, now Pat. No. 10,524,166.

(Continued)

(51) Int. Cl.
*H04W 36/00* (2009.01)
*H04W 92/02* (2009.01)
(Continued)

(52) U.S. Cl.
CPC ......... *H04W 36/0022* (2013.01); *H04W 8/02* (2013.01); *H04W 36/14* (2013.01);
(Continued)

(58) Field of Classification Search
CPC ............... H04W 36/0022; H04W 8/02; H04W 36/0066; H04W 36/14; H04W 92/02
See application file for complete search history.

(56) References Cited

U.S. PATENT DOCUMENTS

2017/0289265 A1    10/2017    Faccin et al.
2017/0339609 A1    11/2017    Youn et al.

FOREIGN PATENT DOCUMENTS

| CN | 101577955 | 11/2009 |
|----|-----------|---------|
| CN | 103430580 | 12/2013 |

(Continued)

OTHER PUBLICATIONS

Chinese Office Action in Chinese Appln. No. 201880002078.3, dated Sep. 1, 2020, 9 pages (with English translation).

(Continued)

*Primary Examiner* — Kyaw Z Soe
(74) *Attorney, Agent, or Firm* — Fish & Richardson P.C.

(57) ABSTRACT

According to an aspect of the present invention, there is provided an interworking method between networks of a user equipment (UE) in a wireless communication system, including: performing a first interworking procedure for changing a network of the UE from a 5-generation core network (5GC) network to an evolved packet core (EPC) network, wherein, when an interface between the 5GC and the EPC networks does not exist, the performing of the first interworking procedure includes: receiving a first indication from an access and mobility management function (AMF) of the 5GC network; and performing a handover attach procedure in the EPC network based on the first indication.

14 Claims, 24 Drawing Sheets

Related U.S. Application Data

(60) Provisional application No. 62/583,495, filed on Nov. 9, 2017, provisional application No. 62/542,807, filed on Aug. 9, 2017, provisional application No. 62/444,396, filed on Jan. 10, 2017, provisional application No. 62/443,838, filed on Jan. 9, 2017.

(51) Int. Cl.
*H04W 8/02* (2009.01)
*H04W 36/14* (2009.01)
*H04W 60/06* (2009.01)
*H04W 60/00* (2009.01)

(52) U.S. Cl.
CPC ........ *H04W 92/02* (2013.01); *H04W 36/0066* (2013.01); *H04W 60/00* (2013.01); *H04W 60/06* (2013.01)

(56) References Cited

FOREIGN PATENT DOCUMENTS

| WO | WO2016126238 | 8/2016 | | |
|----|----|----|----|----|
| WO | WO2018085187 | 5/2018 | | |
| WO | WO-2018085187 A1 * | 5/2018 | ........ | H04W 36/0016 |
| WO | WO2018085713 | 5/2018 | | |
| WO | WO-2018085713 A2 * | 5/2018 | ............ | H04W 48/18 |
| WO | WO2018171918 | 9/2018 | | |

OTHER PUBLICATIONS

LG Electronics, "Interworking options for supporting or non-supporting NGx," S2-17203, SA WG2 Meeting #118-BIS, Spokane, WA, USA, Jan. 16-20, 2017, 3 pages, XP-051216392.

China Mobile, China Unicom, CATT, "Handing of Single Registration without Nx support," S2-1723063, SA WG2 Meeting #121, Hangzhou, China, May 15-19, 2017, 3 pages, XP-051268545.

Extended European Search Report in European Application No. 18736726.3, dated Sep. 11, 2019, 9 pages.

3rd Generation Partnership Project; Technical Specification Group Services and System Aspects; "Study on Architecture for Next Generation System (Release 14)," 3GPP TR 23. 799 V14.0.0, dated Dec. 2016, 527 pages, XP-051295448.

CATT, "Interworking Between LTE and 5G NR," 3GPP TSG RAN WG2, Meeting #93bis, R2-162566, Agenda Item 9.3.1, Dubrovnik, Croatia, Apr. 11-15, 2016, 4 pages.

Intel Corporation, "Interworking Between EPC and NGC," 3GPP TSG RAN WG3, Meeting #94, R3-62798, Agenda Item 10.6.1, Reno, Nevada, Nov. 14-18, 2016, 3 pages.

NEC, "Tight Interworking Between NR and LTE," 3GPP TSG RAN2, Meeting #93bis, R2-162889, Agenda Item 9.3.1, Overall Architecture, Dubrovnik, Croatia, Apr. 11-15, 2016, 5 pages.

3GPP TR 23.799, V.1.1.0 (Oct. 2016), 3rd Generation Partnership Project; Technical Specification Group Services and System Aspects; Study on Architecture for Next Generation System (Release 14), Oct. 2016, 503 pages.

3rd Generation Partnership Project; Technical Specification Group Services and System Aspects; "Study on Architecture for Next Generation System (Release 14)," 3GPP TR 23.799 V2.0.0, dated Nov. 2016, 523 pages.

LG Electronics Inc., "Dual radio operation with dual attach for inter-RAT mobility," R2-1700310, 3GPP TSG-RAN2 WG2 NR Ad hoc, Spokane, USA, dated Jan. 17-19, 2017, 4 pages.

JP Office Action in Japanese Appln. No. 2020-089005, dated Jul. 6, 2021, 5 pages (with English translation).

Nokia et al., "Interim agreements on KI 18: Interworking and migration," Presented at SA WG2 Meeting #118, Nov. 14-18, Reno, NV USA, 4 pages.

* cited by examiner

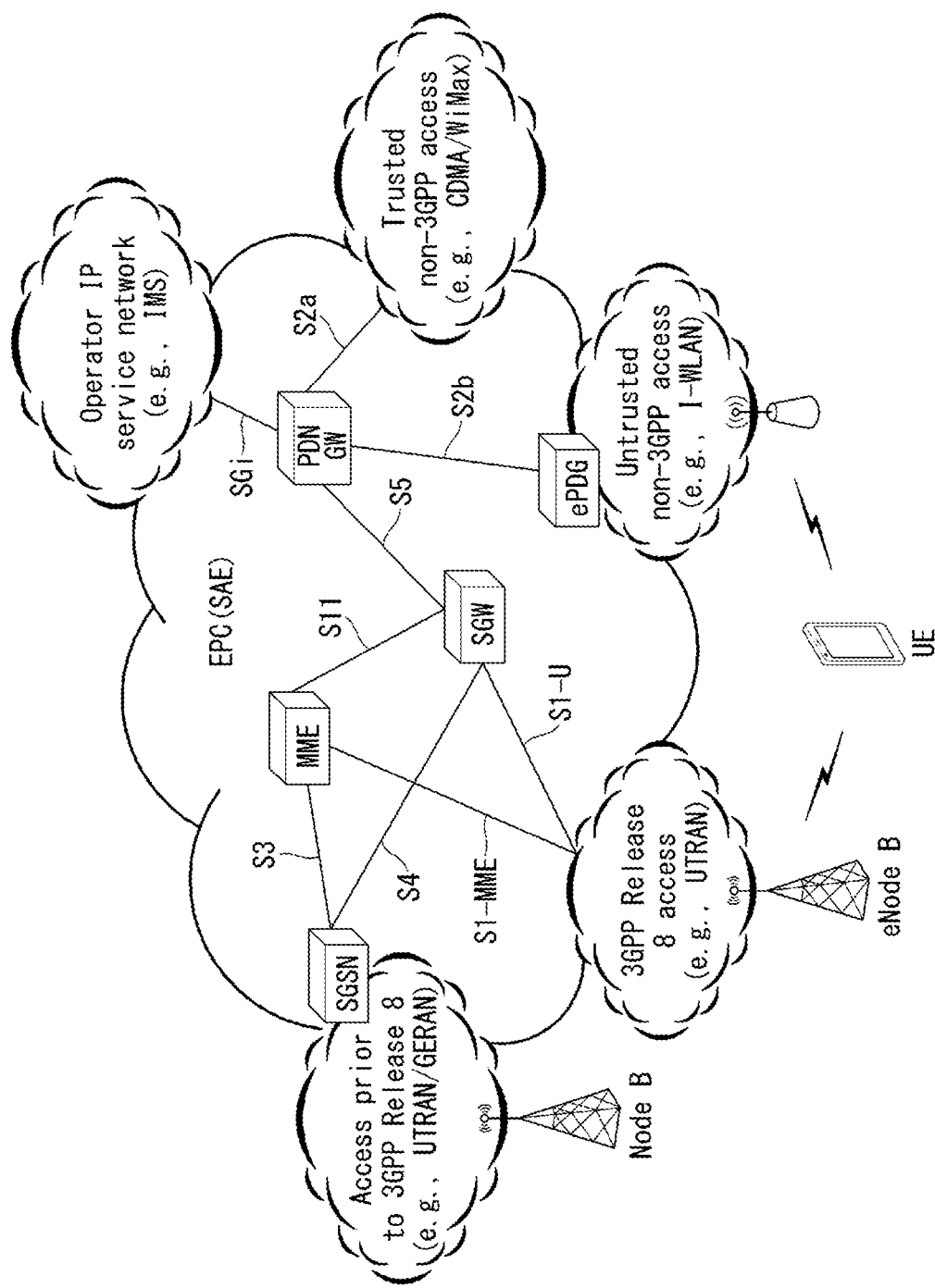
[Fig. 1]

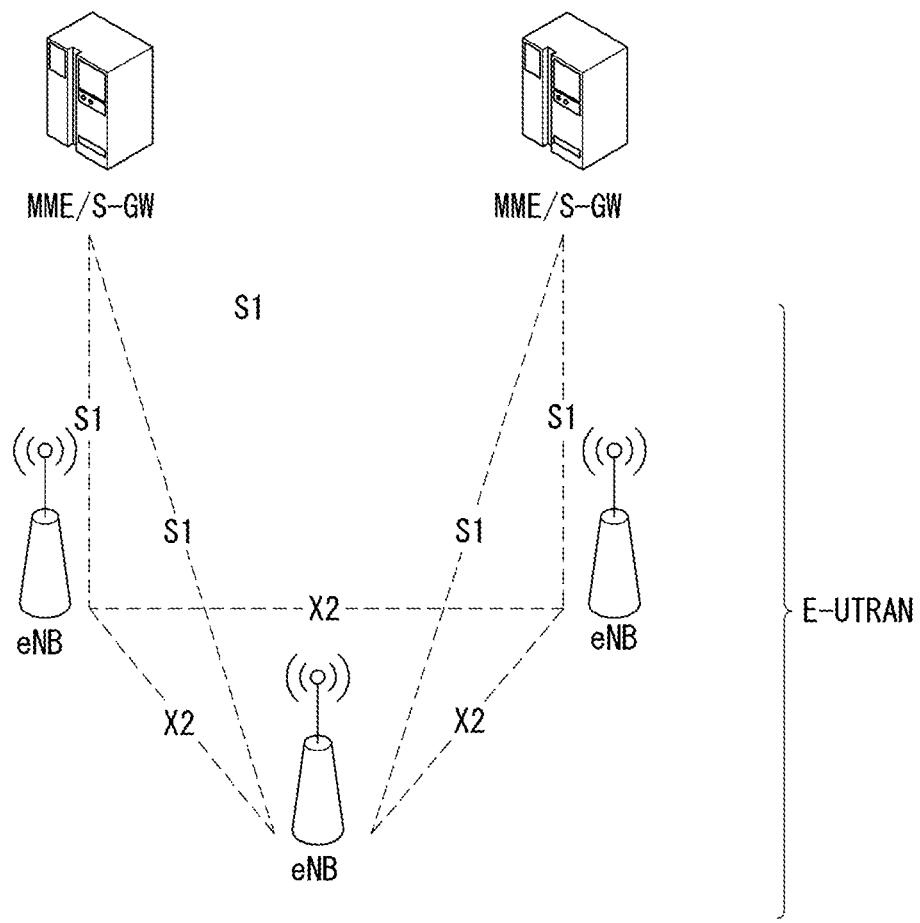
[Fig. 2]

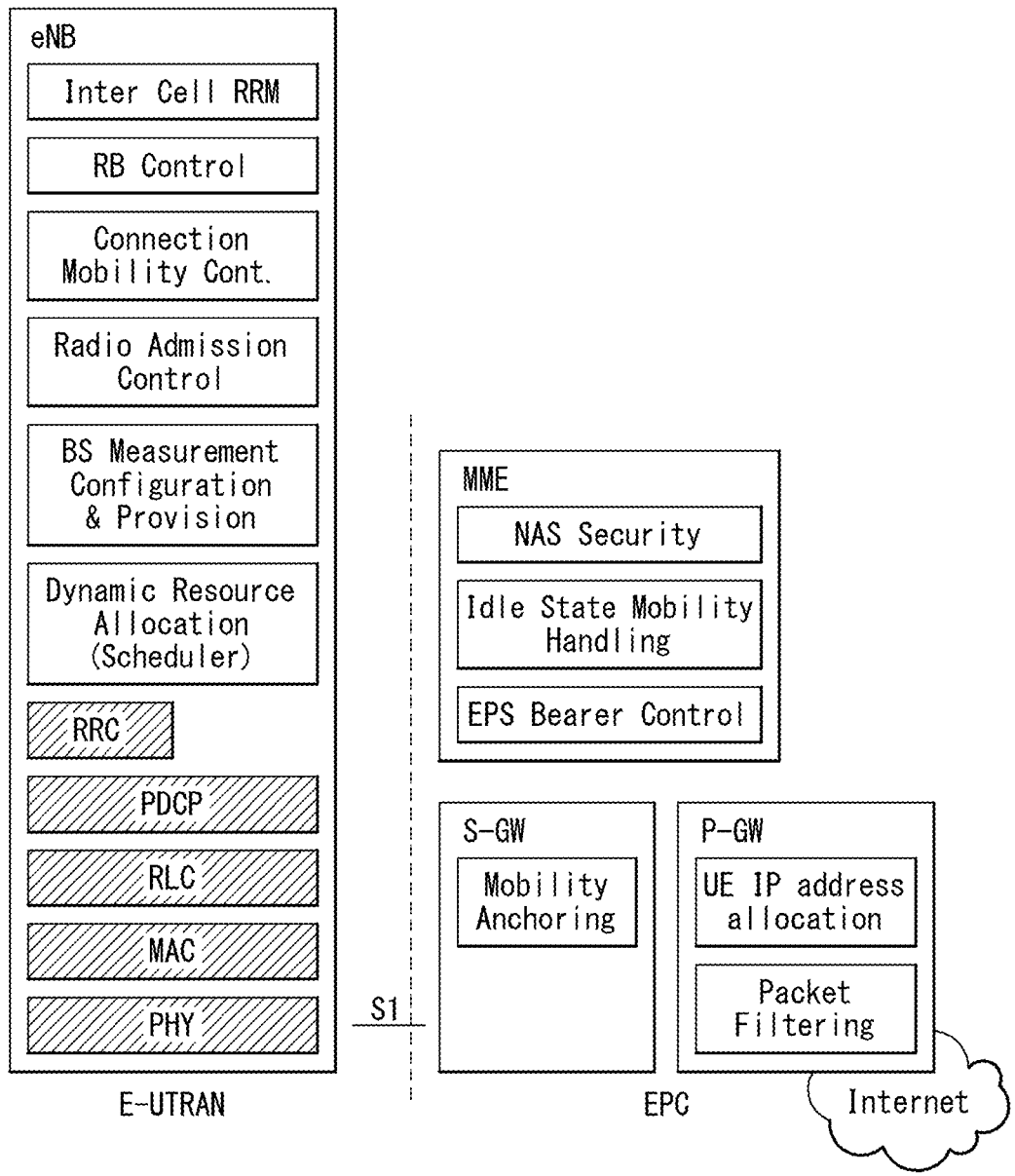
[Fig. 3]

[Fig. 4]
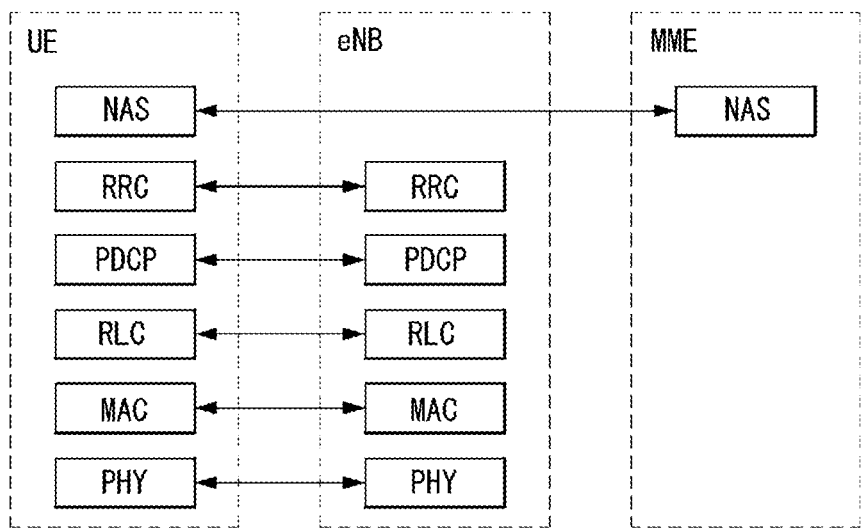
(a) Control plane protocol stack
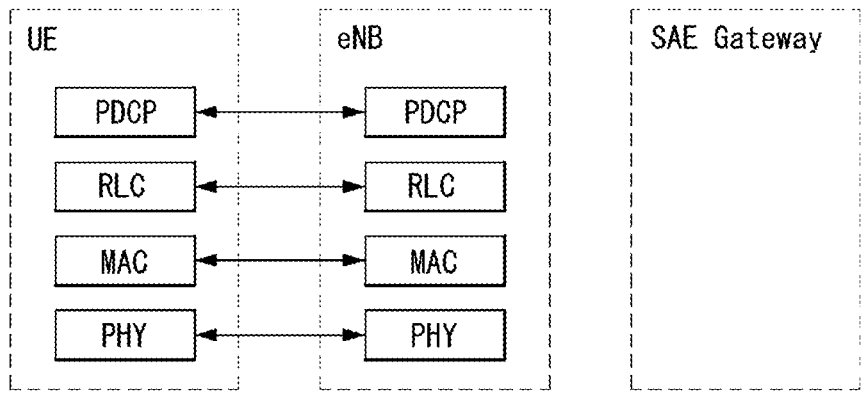
(b) User plane protocol stack

[Fig. 5]
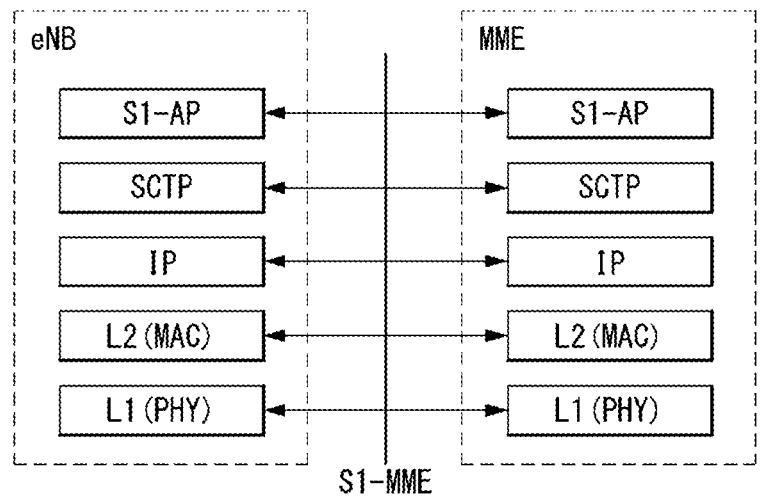
(a) control-plane protocol stack
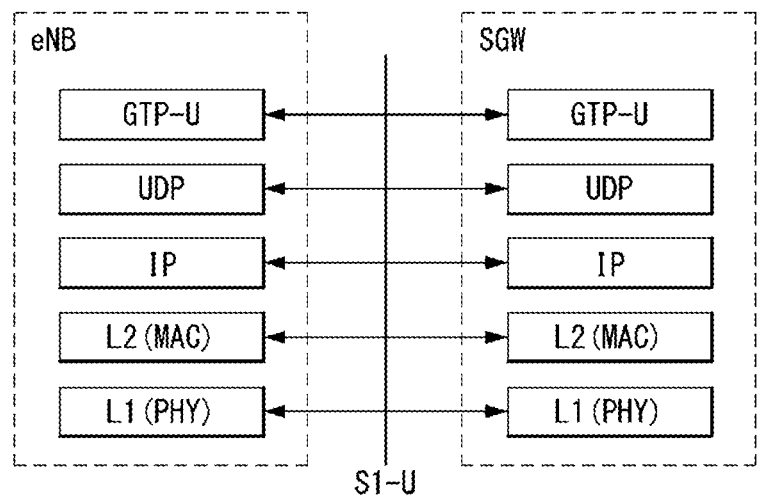
(b) user-plane protocol stack

[Fig. 6]
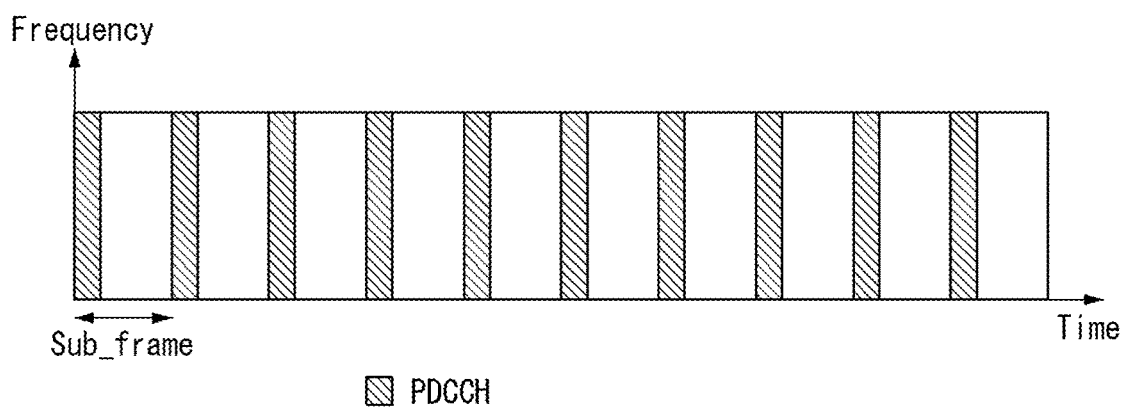
[Fig. 7]
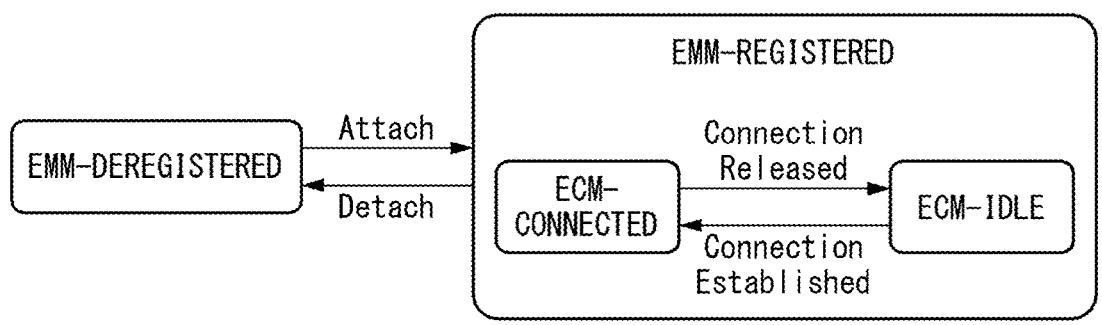
[Fig. 8]
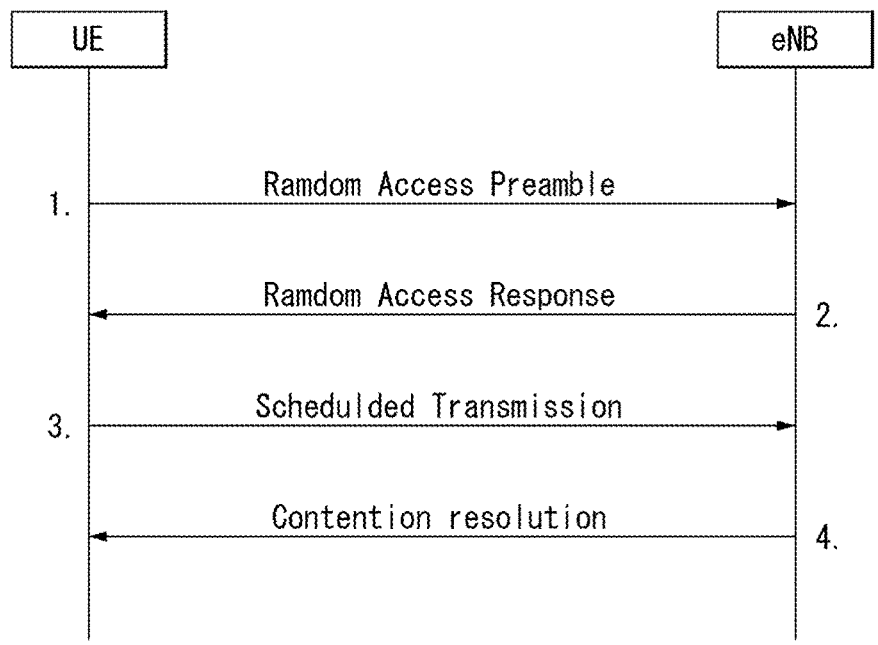

[Fig. 9]
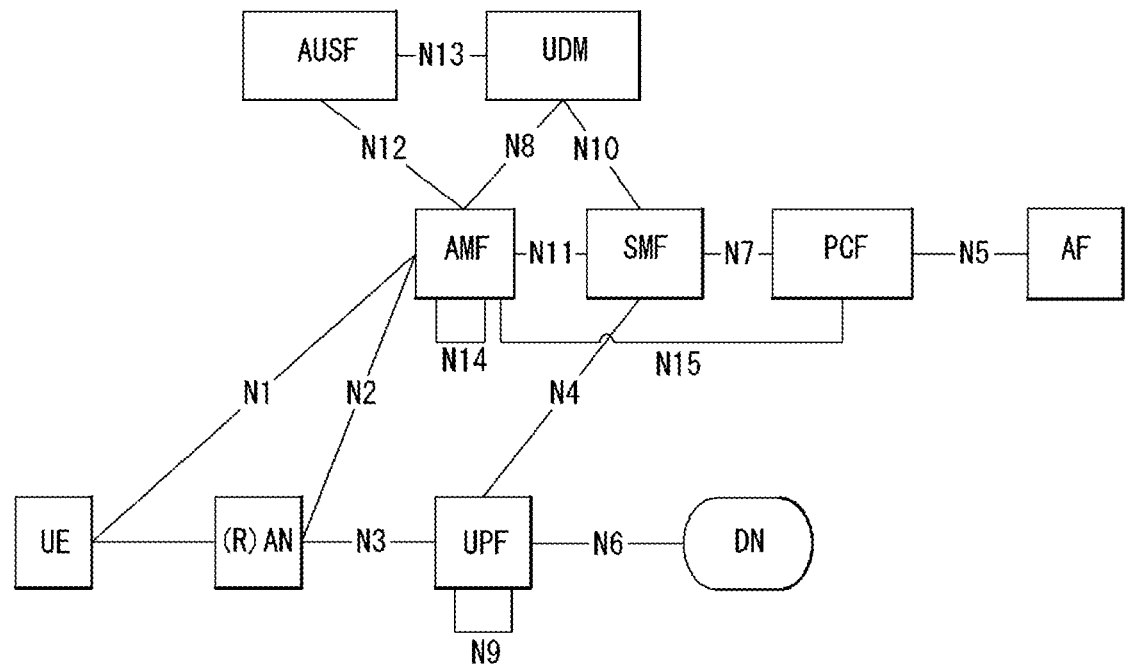
[Fig. 10]
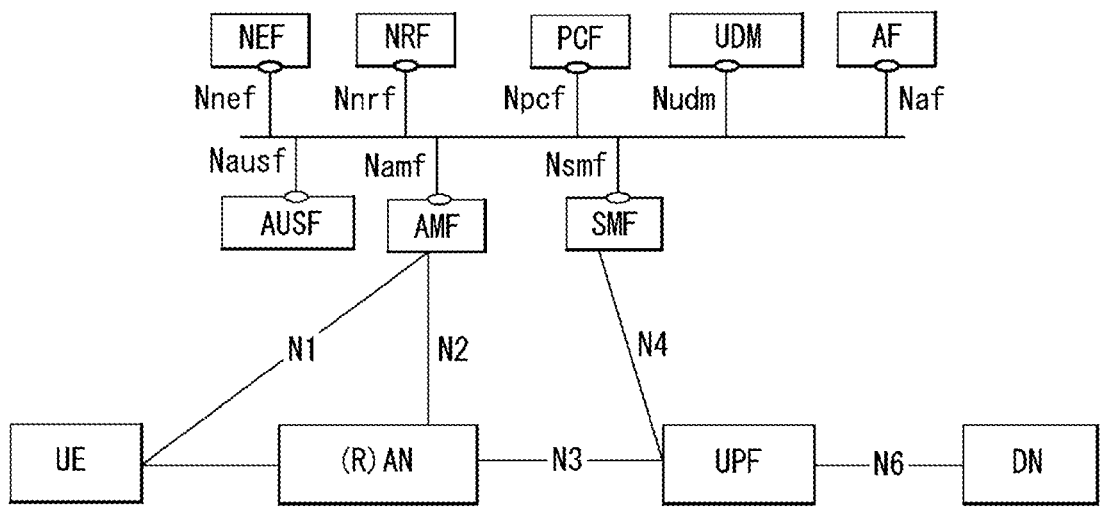

[Fig. 11]
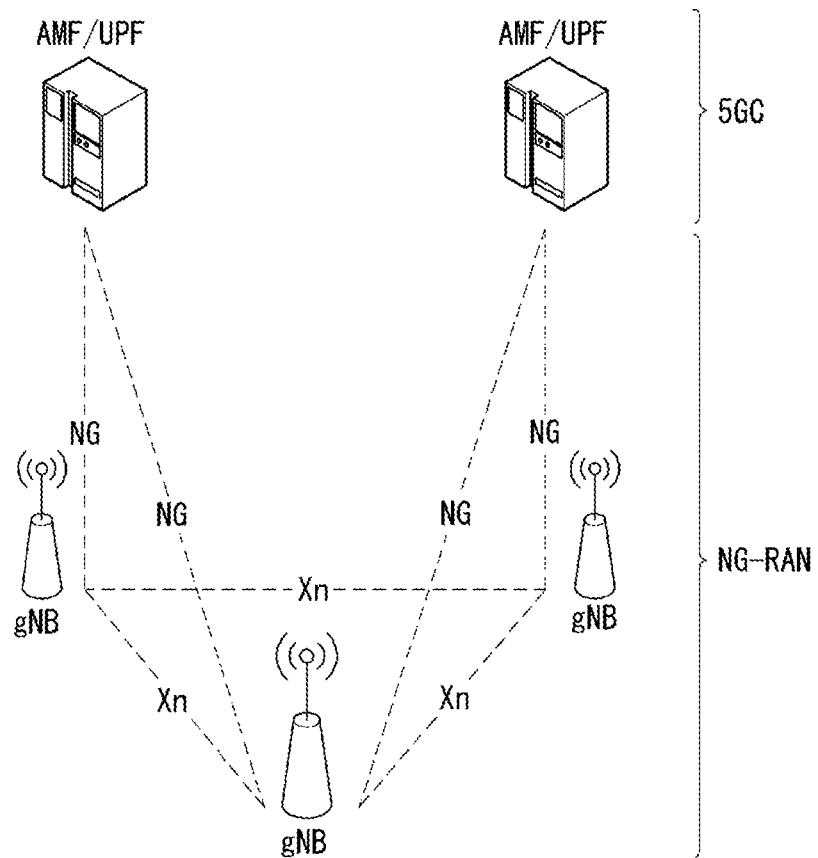

[Fig. 12]
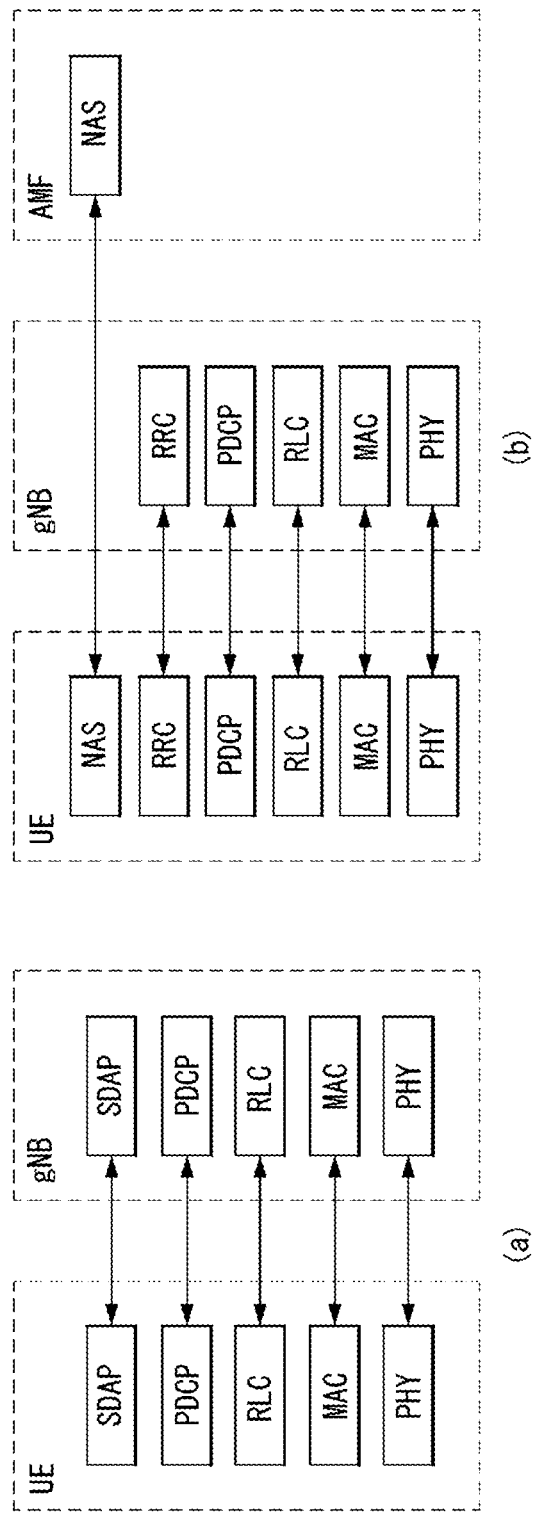

[Fig. 13]
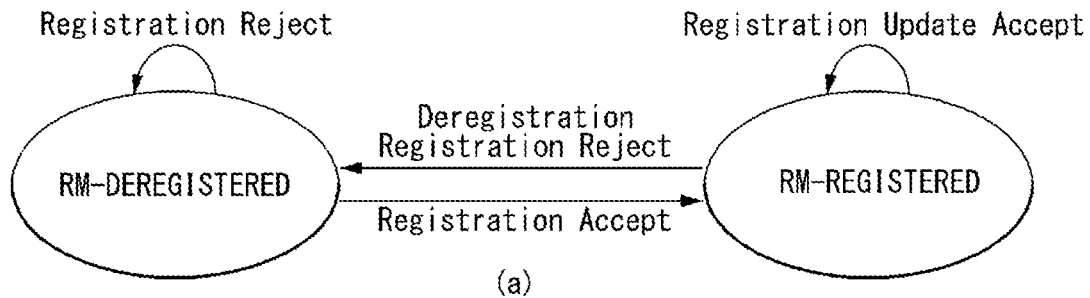
(a)
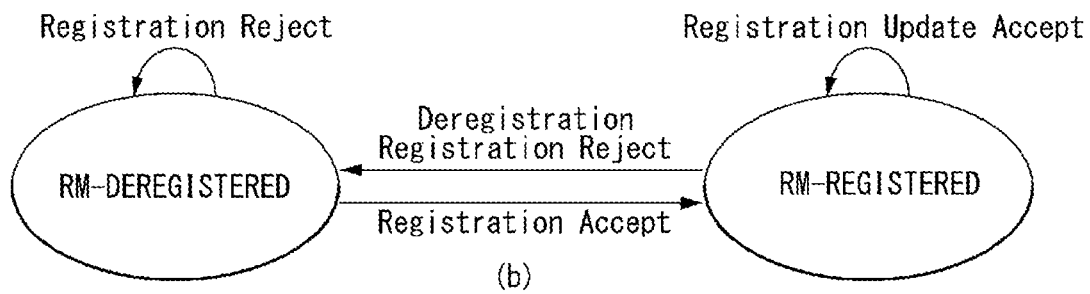
(b)
[Fig. 14]
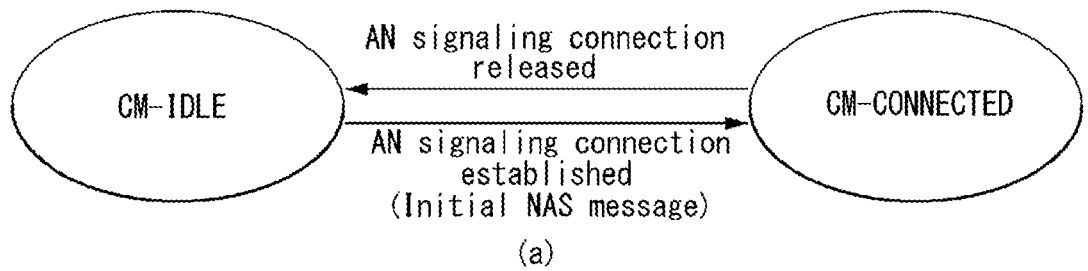
(a)
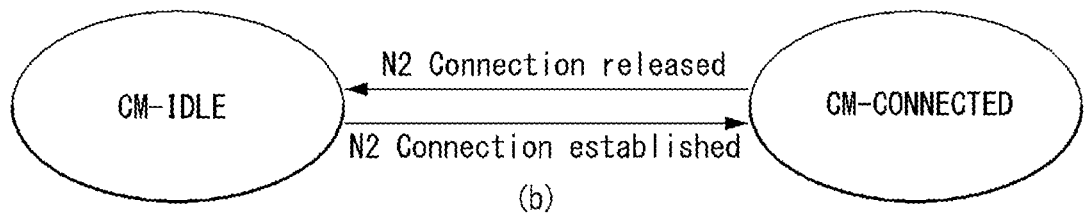
(b)

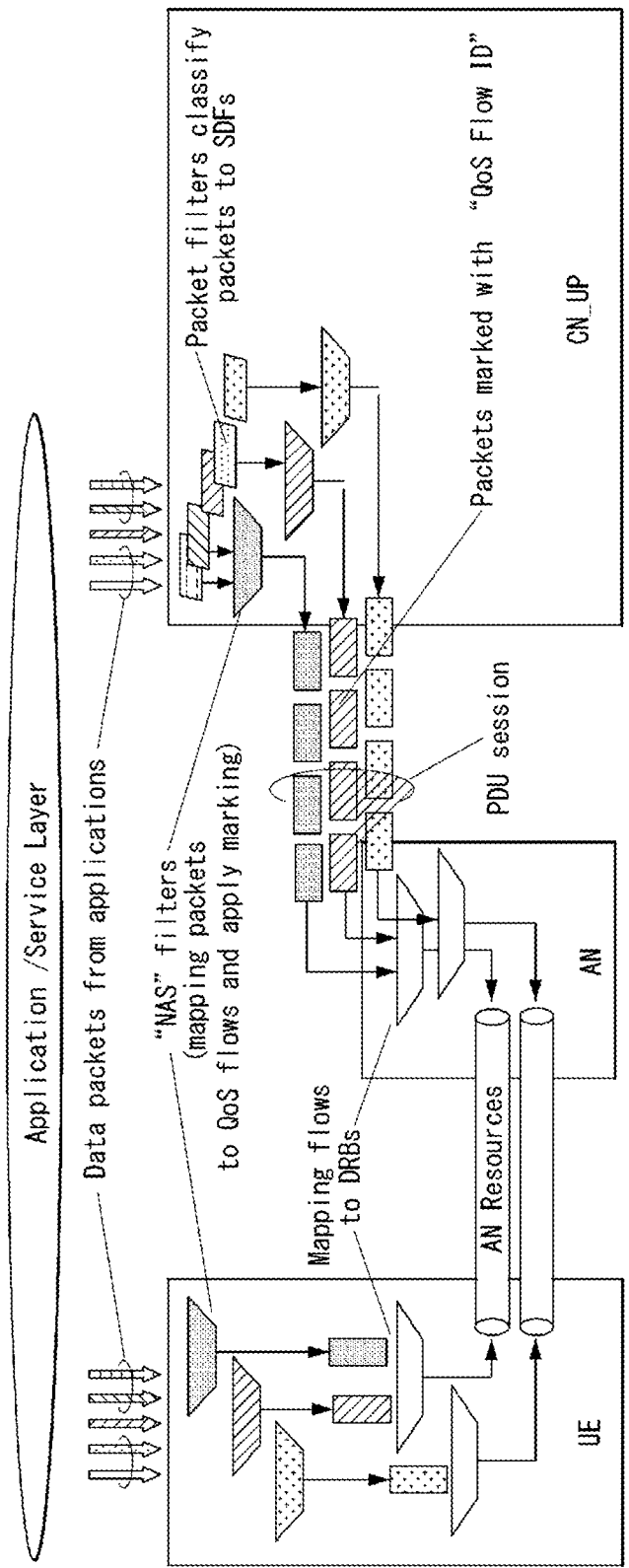
[Fig. 15]

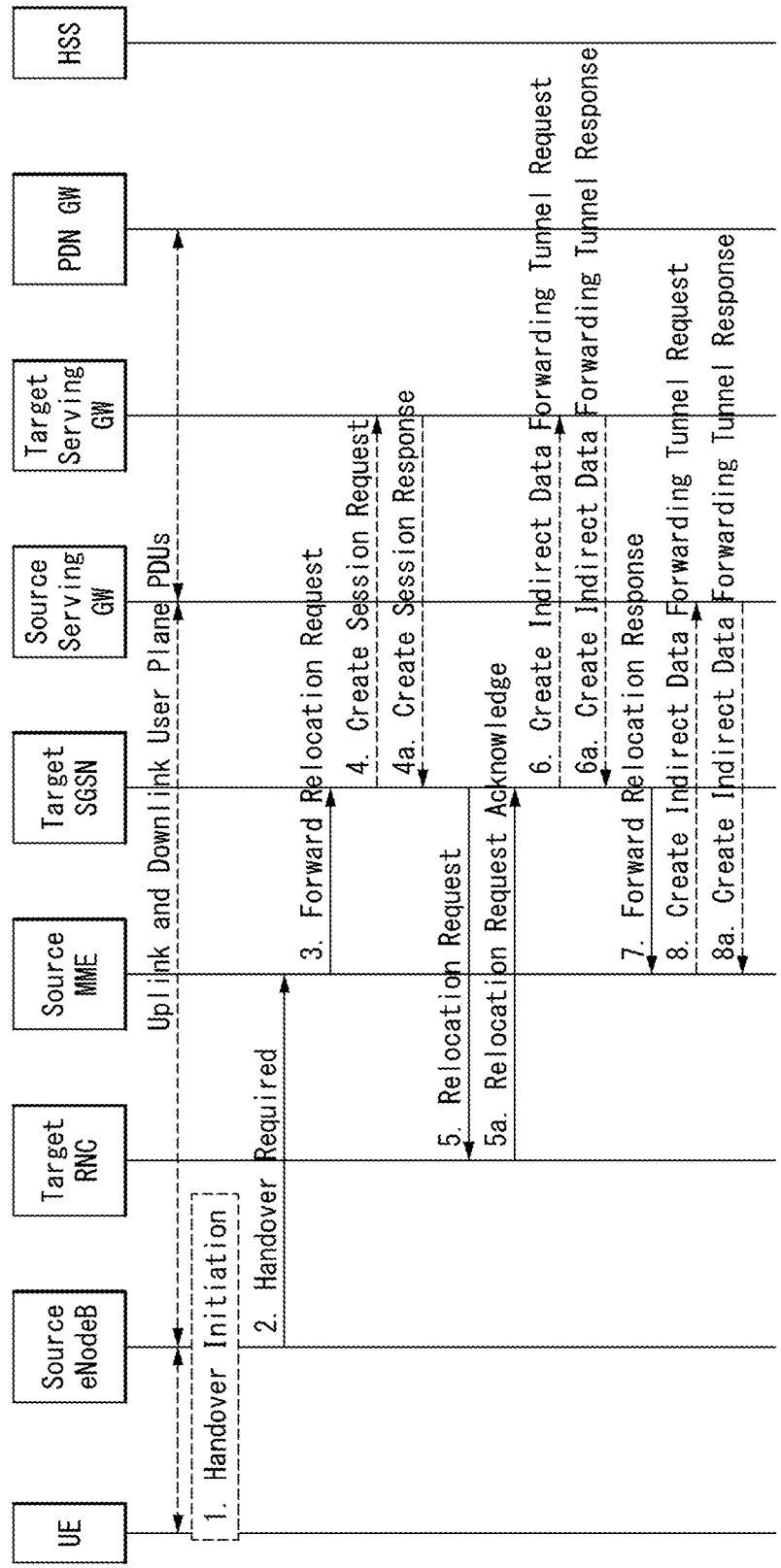
[Fig. 16]

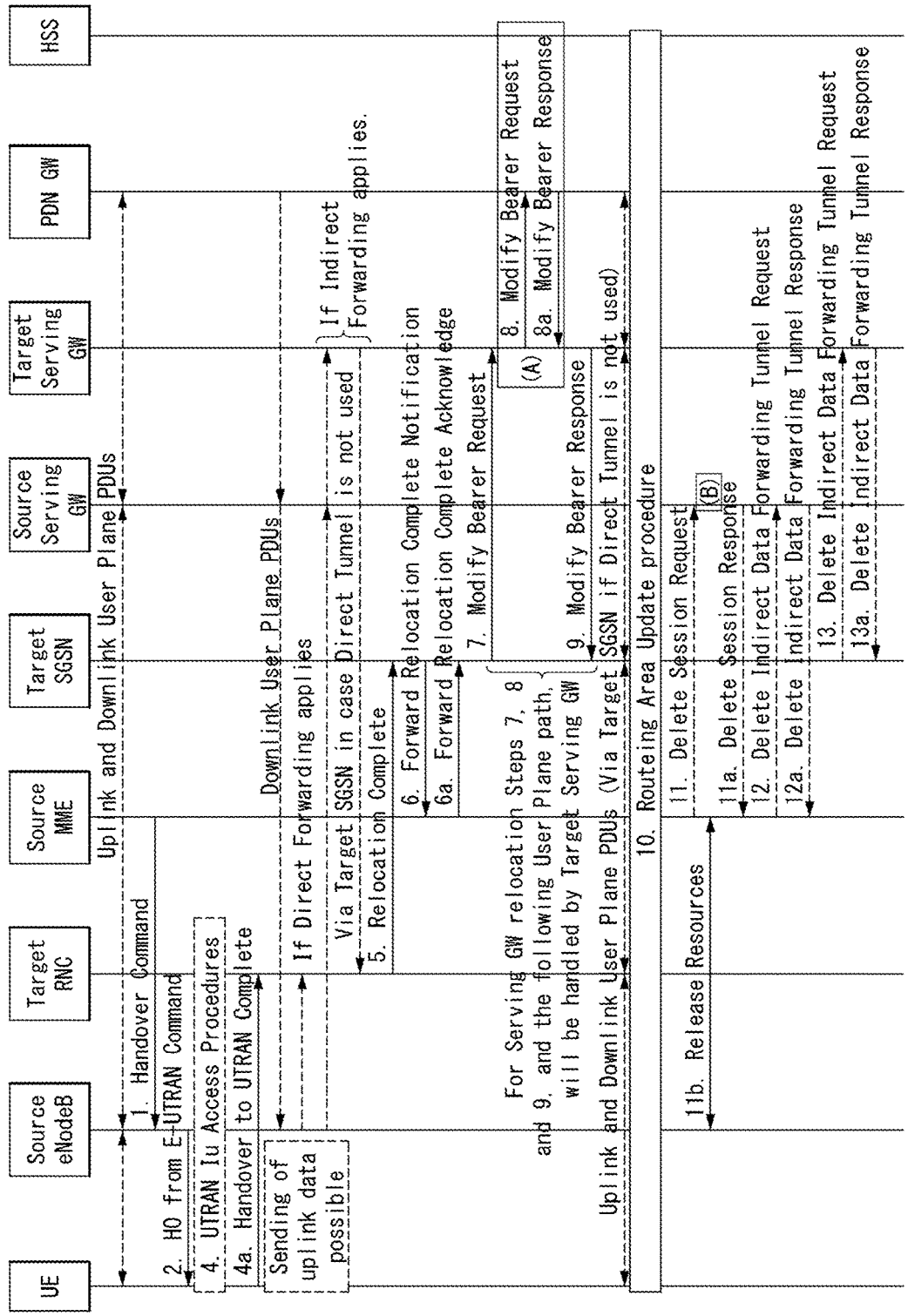
[Fig. 17]

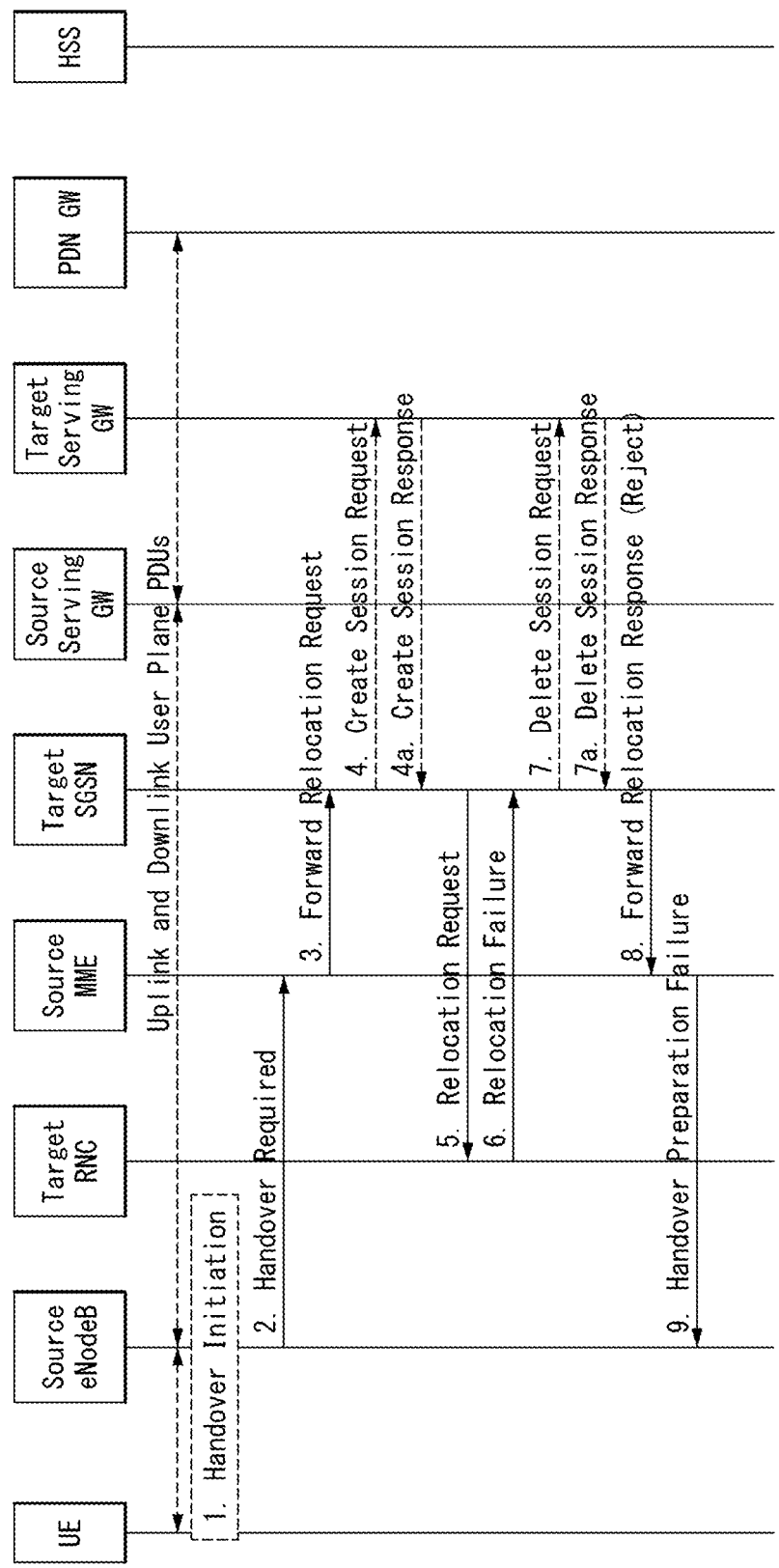

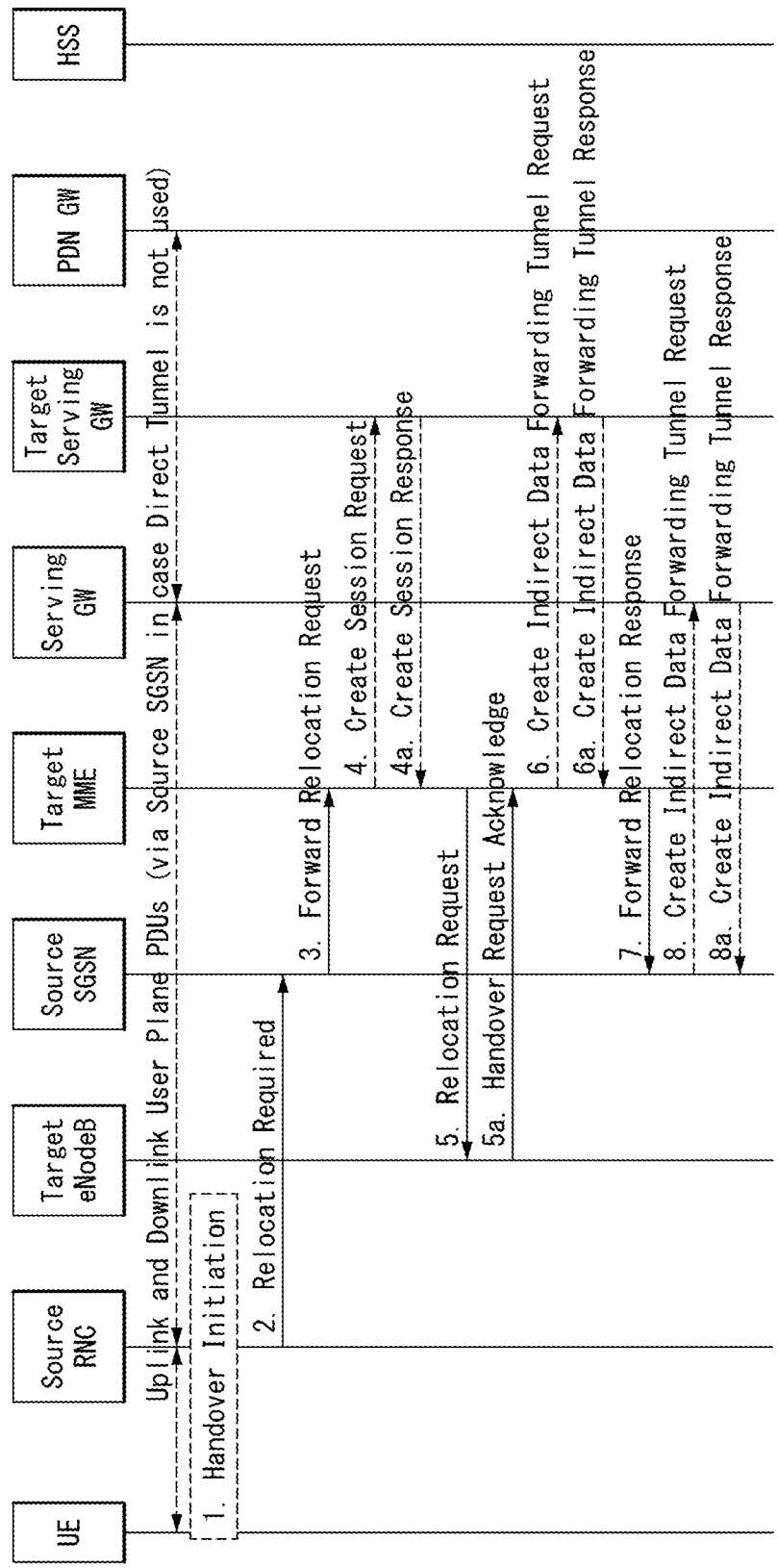

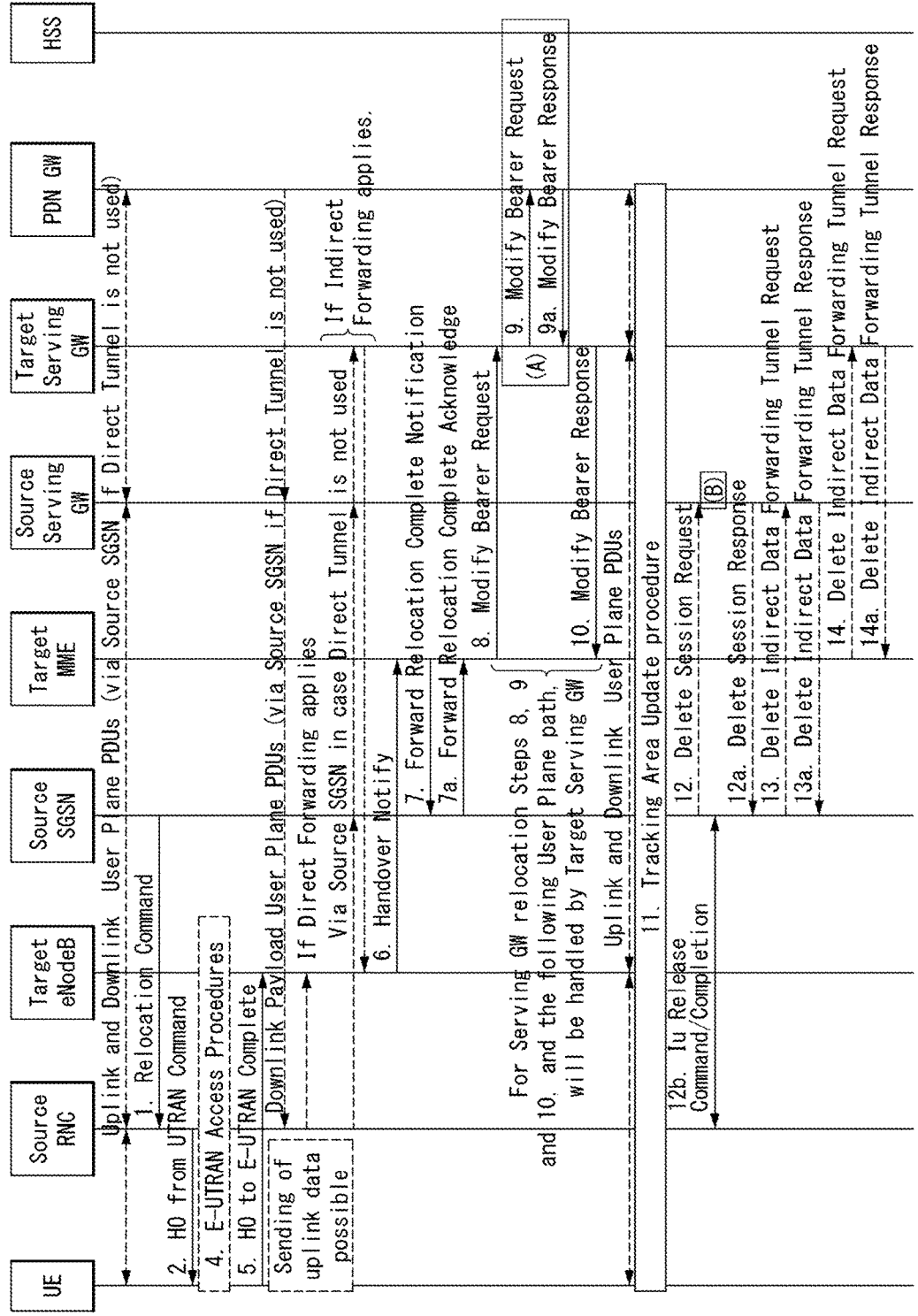

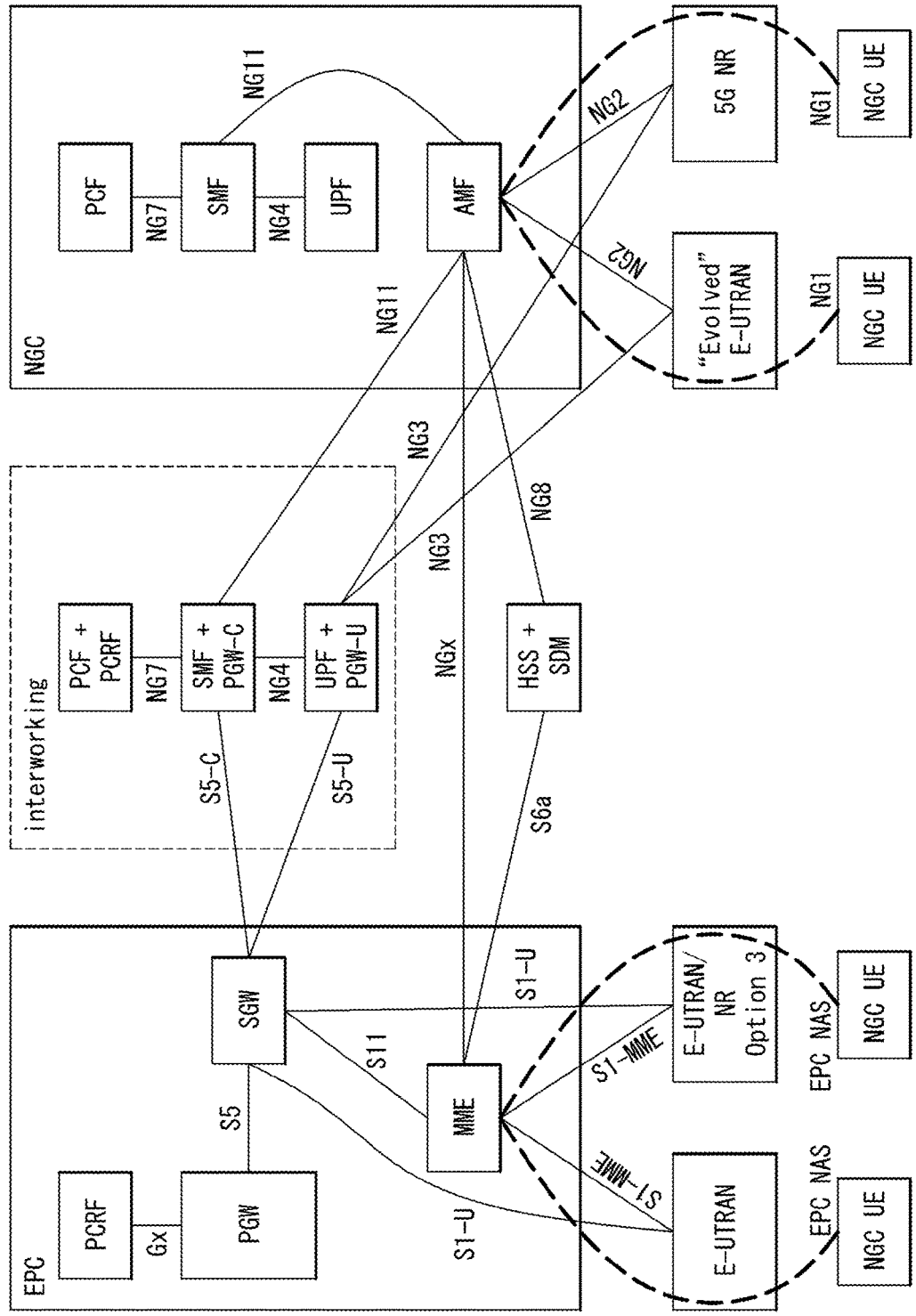
[Fig. 21]

[Fig. 22]
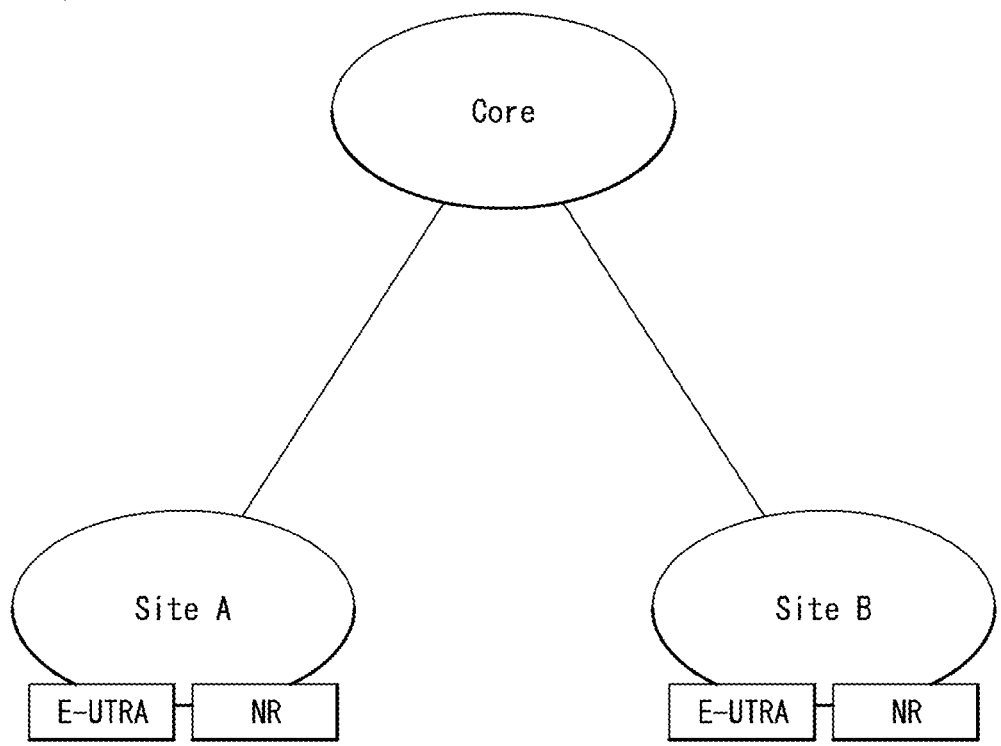
[Fig. 23]
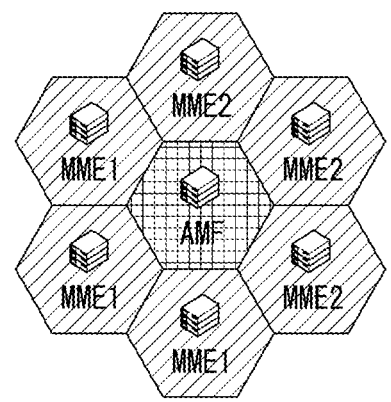

[Fig. 24]
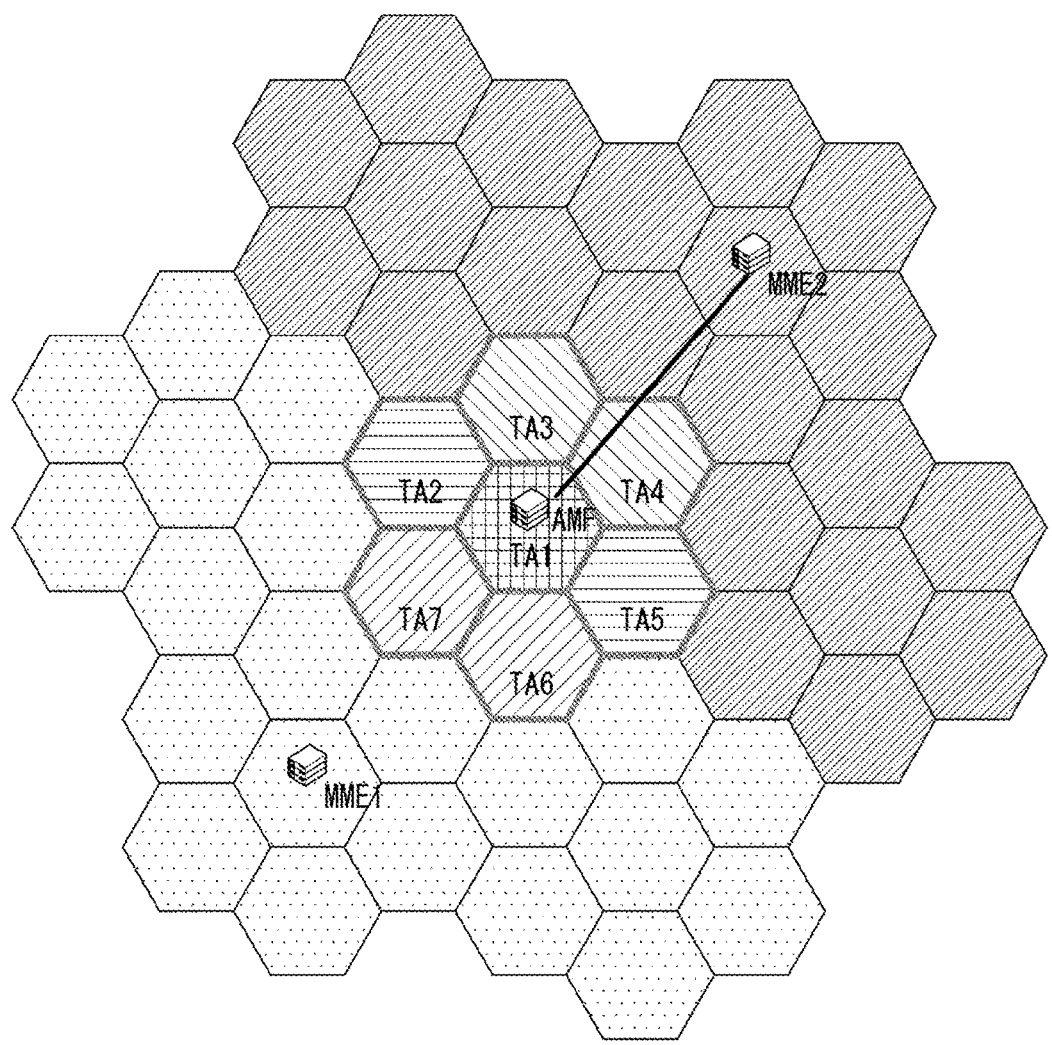

[Fig. 25]
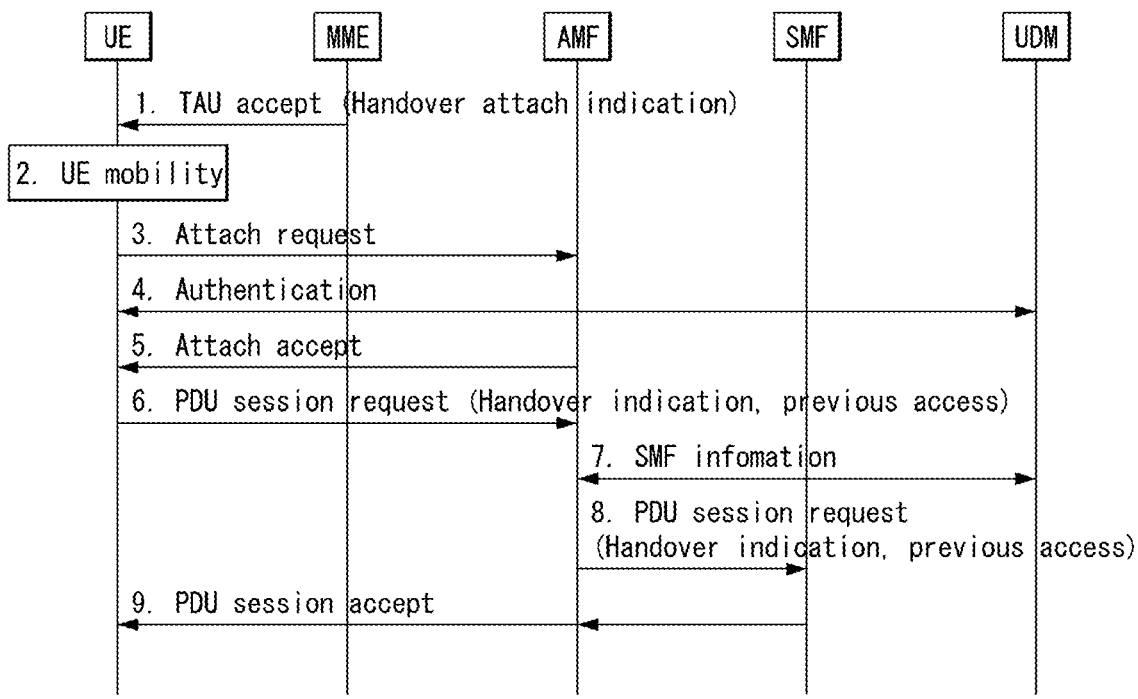
[Fig. 26]
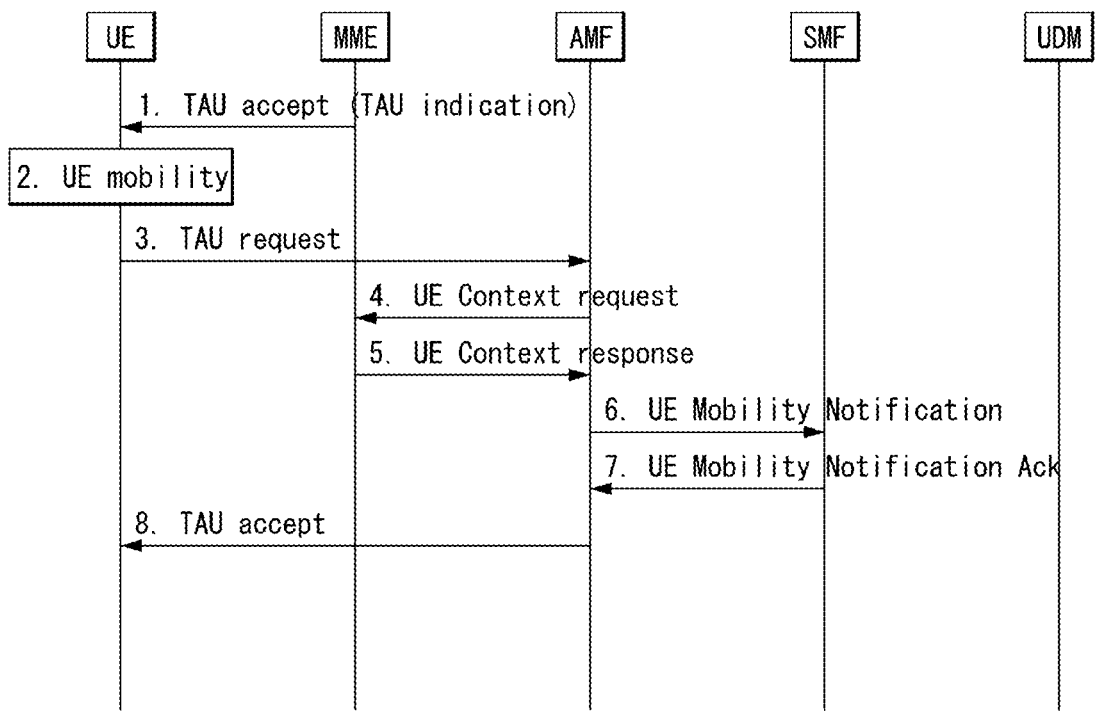

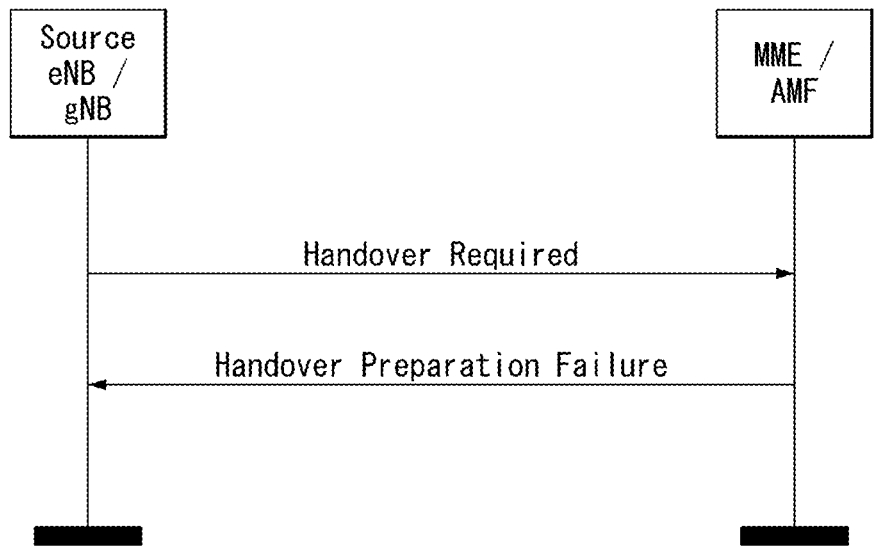
[Fig. 27]
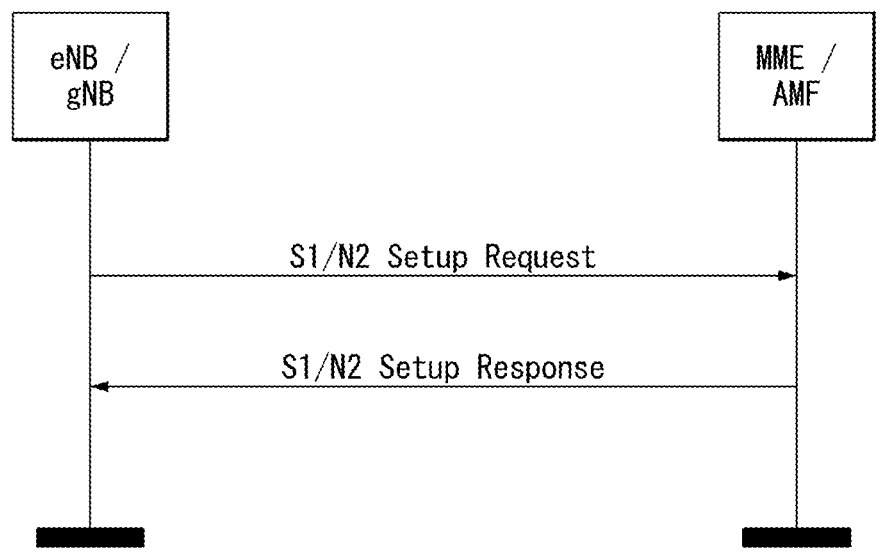
[Fig. 28]

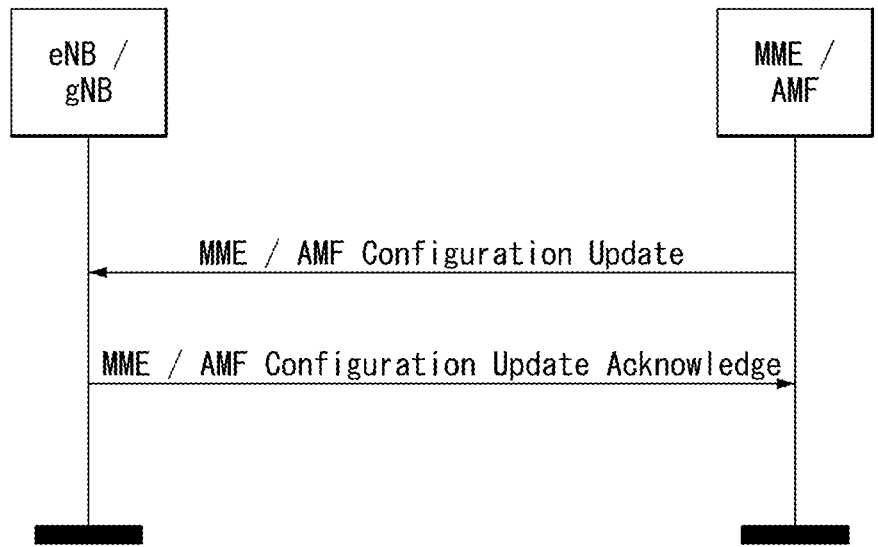
[Fig. 29]
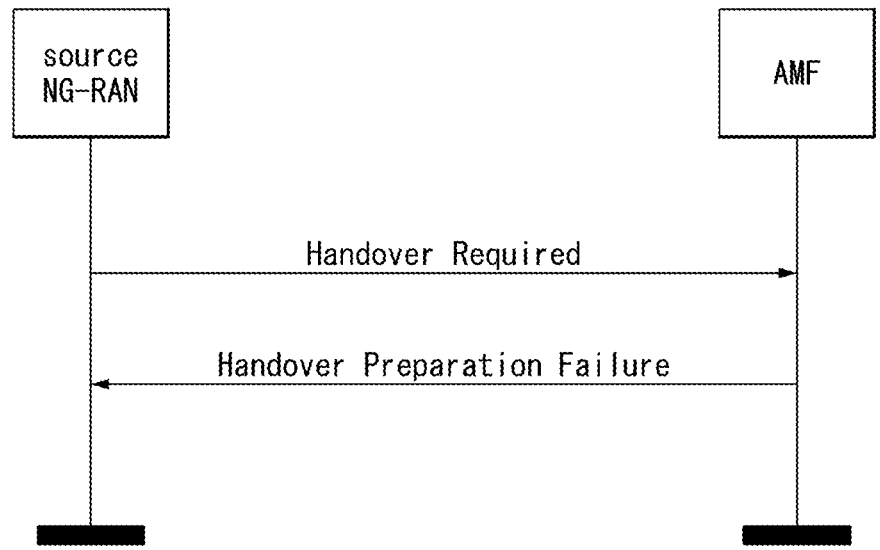
[Fig. 30]

[Fig. 31]
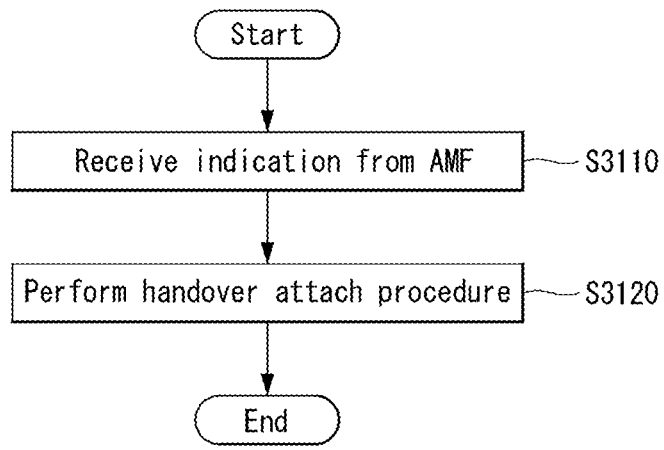
[Fig. 32]
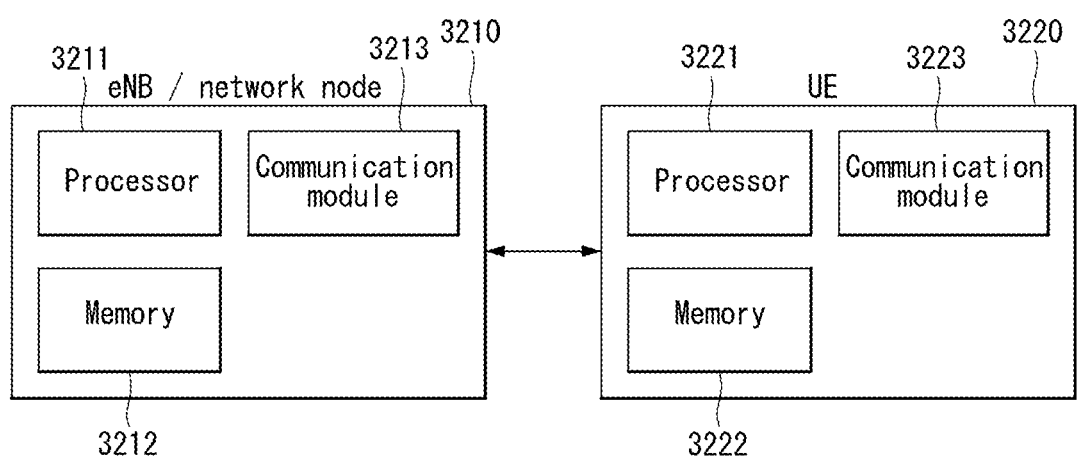

[Fig. 33]
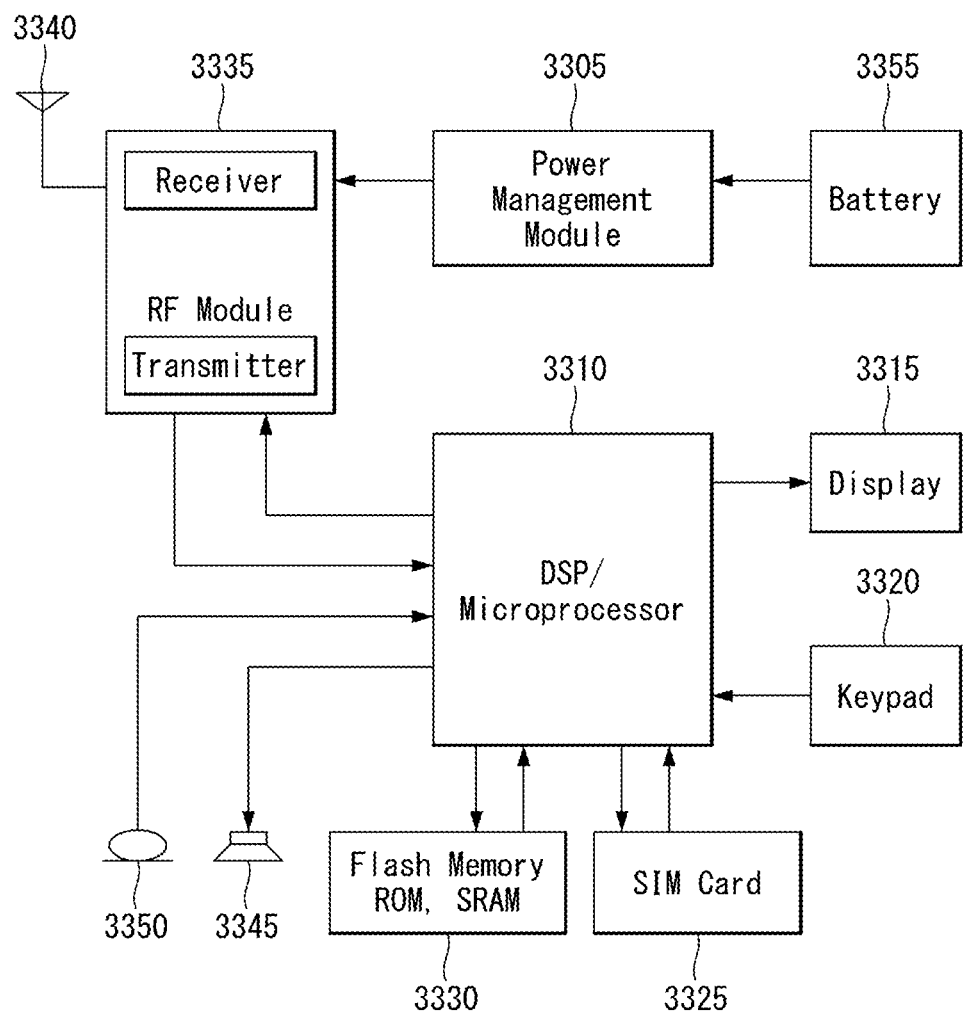

METHOD FOR INTERWORKING BETWEEN NETWORKS IN WIRELESS COMMUNICATION SYSTEM AND APPARATUS THEREOF

CROSS REFERENCE TO RELATED APPLICATIONS

This application is a continuation of U.S. application Ser. No. 16/064,732, filed on Jun. 21, 2018, now allowed, which is the National Stage filing under 35 U.S.C. 371 of International Application No. PCT/KR2018/000440, filed on Jan. 9, 2018, which claims the benefit of U.S. Provisional Applications No. 62/443,838, filed on Jan. 9, 2017, No. 62/444,396, filed on Jan. 10, 2017, No. 62/542,807, filed on Aug. 9, 2017, and No. 62/583,495, filed on Nov. 9, 2017, the contents of which are all hereby incorporated by reference herein in their entirety.

TECHNICAL FIELD

The present invention relates to a wireless communication, and more particularly, to an interworking method between networks and an apparatus for the same.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

Particularly, for the device in which power consumption significantly influences on the life of the device, various techniques for decreasing the power consumption has been vigorously developed.

DISCLOSURE

Technical Problem

The present invention proposes a method for efficiently performing an interworking procedure between an EPC and a 5G cores in a wireless communication system. In particular, the present invention proposes a solution in terms of a network node in order to reduce the load imposed on a user equipment (UE) in the interworking procedure.

There is provided an embodiment of a method and an apparatus for solving the above technical problems. It is to be understood that both the foregoing general description and the following detailed description are exemplary and explanatory and are not to be construed as limiting the invention as defined by the appended claims and their equivalents.

Technical Solution

According to an aspect of the present invention, there is provided an interworking method between networks of a user equipment (UE) in a wireless communication system, including: performing a first interworking procedure for changing a network of the UE from a 5-generation core network (5GC) network to an evolved packet core (EPC) network, wherein, when an interface between the 5GC and the EPC networks does not exist, the performing of the first interworking procedure includes: receiving a first indication from an access and mobility management function (AMF) of the 5GC network; and performing a handover attach procedure in the EPC network based on the first indication.

The performing of the first interworking procedure may include, when the interface between the 5GC and the EPC networks exists, not receiving the first indication from the AMF, and performing a tracking area update (TAU) procedure in the EPC network.

A packet data unit (PDU) session generated for the UE in the 5GC may be transferred to the EPC network through the handover attach procedure or the TAU procedure.

The performing of the handover attach procedure may include: transmitting a PDN connectivity request message in which a request type is set to a handover to a mobility management entity (MME) of the EPC.

The interworking method may further include: transmitting, to the MME, information indicating that the UE moves from the 5GC.

The EPC may have an EPC-'globally unique temporary user equipment identity (GUTI)' mapped with a GUTI of the 5GC.

The interworking method may further include, when the interface between the 5GC and the EPC networks does not exist and the UE is in a connected mode in the 5GC, performing radio resource control (RRC) release with a 'next-generation (NG)'-'radio access network (RAN)' of the 5GC and camping on a cell connected to the EPC.

The interworking method may further include: performing a second interworking procedure for changing the network of the UE from the EPC network to the 5GC network, wherein, when the interface between the 5GC and the EPC network does not exist, the performing of the second interworking procedure includes: receiving a second indication from a mobility management entity (MME) of the EPC network; and performing a registration procedure in the 5GC network based on the second indication.

A packet data unit (PDU) session generated for the UE in the EPC may be transferred to the 5GC network through the registration procedure.

The registration procedure may be a registration procedure in which a registration type is set to a mobility registration update.

The interworking method may further include: transmitting, to the AMF, information indicating that the UE is moved from the EPC.

The 5GC may have a 5GC-'globally unique temporary user equipment identity (GUTI)' mapped with a GUTI of the EPC.

The interworking method may further include, when the interface between the 5GC and the EPC networks does not exist and the UE is in a connected mode in the EPC: performing radio resource control (RRC) release with an 'evolved universal terrestrial radio access network' (E-TURAN) of the EPC.

According to another aspect of the present invention, there is provided a user equipment (UE) for performing an interworking method between networks in a wireless communication system, including: a communication module configured to transmit and receive signals; and a processor configured to control the communication module, wherein the processor is configured to: perform a first interworking procedure for changing a network of the UE from a 5-generation core network (5GC) network to an evolved packet core (EPC) network, when an interface between the 5GC and the EPC networks does not exist, receive an indication from an access and mobility management function (AMF) of the 5GC network; and perform a handover attach procedure in the EPC network based on the indication.

When the interface between the 5GC and the EPC networks exists, the processor may not receive the indication from the AMF and may perform a tracking area update (TAU) procedure in the EPC.

Advantageous Effects

According to one or more embodiments of the present invention, since the interworking procedure between networks is clearly defined, the ambiguity of the procedure execution is eliminated.

Also, according to one or more embodiments of the present invention, since the network node instructs the user equipment (UE) whether to perform a TAU or a handover attach/registration procedure in order to interwork with each other, the burden on the UE is reduced, and the service interruption time due to the interworking is reduced by appropriately performing the TAU.

The effects obtained by the present invention are not limited to the effects mentioned above, and other effects not mentioned can be clearly understood by those skilled in the art from the following description.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 illustrates structures of an E-UTRAN and an EPC in a wireless communication system to which the present invention may be applied.

FIG. 4 illustrates a radio interface protocol structure between a UE and an E-UTRAN in a wireless communication system to which the present invention may be applied.

FIG. 5 illustrates an S1 interface protocol structure in a wireless communication system to which the present invention may be applied.

FIG. 6 illustrates a physical channel structure in a wireless communication system to which the present invention may be applied.

FIG. 7 illustrates an EMM and ECM states in a wireless communication system to which the present invention may be applied.

FIG. 8 illustrates a contention-based random access procedure in a wireless communication system to which the present invention may be applied.

FIG. 9 illustrates a 5G system architecture using reference point representation.

FIG. 10 illustrates a 5G system architecture using a service-based representation.

FIG. 11 illustrates an NG-RAN architecture to which the present invention may be applied.

FIG. 12 illustrates a wireless protocol stack to which the present invention may be applied.

FIG. 13 illustrates an RM state model to which the present invention may be applied.

FIG. 14 illustrates a CM state model to which the present invention may be applied.

FIG. 15 illustrates a classification and user plane marking for a QoS flow and a mapping of QoS flows to AN resources according to an embodiment of the present invention.

FIG. 16 is a flowchart illustrating an E-UTRAN to UTRAN Iu mode inter-RAT HO (Handover) preparation phase that may be applied to the present invention.

FIG. 17 is a flowchart illustrating an E-UTRAN to UTRAN Iu mode inter-RAT HO (Handover) execution phase according to an embodiment of the present invention.

FIG. 18 is a flowchart illustrating an E-UTRAN to UTRAN Iu mode inter-RAT HO (Handover) rejection according to an embodiment of the present invention.

FIG. 19 is a flowchart illustrating a UTRAN Iu mode to E-UTRAN inter-RAT HO (handover) preparation phase according to an embodiment of the present invention.

FIG. 20 illustrates a UTRAN Iu mode to E-UTRAN inter-RAT HO (handover) execution phase according to an embodiment of the present invention.

FIG. 21 illustrates an interworking architecture between an EPC and a 5GC (or NGC (Next-generation core)) that may be applied to the present invention.

FIG. 22 is a diagram illustrating the deployment of a 5G RAN that may be connected to a NG core.

FIGS. 23 and 24 illustrate the arrangement of a 5G network to which the present invention may be applied.

FIG. 25 is a flowchart illustrating an interworking procedure when a UE moves from an EPC to a 5GC according to an embodiment of the present invention.

FIG. 26 is a flowchart illustrating an interworking procedure when a UE moves from an EPC to a 5GC according to an embodiment of the present invention.

FIGS. 27 to 29 are flowcharts illustrating an eNB/gNB operation procedure for determining whether a handover attach/registration is possible depending on whether there is an NGx (for example, N26) interface according to an embodiment of the present invention.

FIG. 30 is a diagram illustrating a failed handover preparation operation according to an embodiment of the present invention.

FIG. 31 is a flowchart illustrating an interworking method between networks of an UE according to an embodiment of the present invention.

FIG. 32 illustrates a block diagram of a communication device according to an embodiment of the present invention.

FIG. 33 illustrates a block diagram of a communication device according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

Home NodeB: It is installed indoors as a based station, and the coverage is a micro cell scale.

Home eNodeB: It is installed indoors as a base station of the EPS network, and the coverage is a micro cell scale.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow Open Mobile Alliance Device Management (OMA DM): A protocol designed to manage mobile devices such as mobile phones, PDAs, and portable computers, which performs such functions as device configuration, firmware upgrade, and error report Operation Administration and Maintenance (OAM): A network management function group which provides network fault indication, performance information, and data and diagnostic functions NAS configuration MO (Management Object): A Management Object (MO) used to configure the UE with the parameters associated with the NAS functionality.

PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

APN (Access Point Name): A string that refers to or identifies the PDN. It is a name (string) (e.g., internet.mnc012.mcc345.gprs) predefined in the network when the P-GW is accessed to access the requested service or network (PDN).

Home Location Register (HLR)/Home Subscriber Server (HSS): A database (DB) that represents subscriber information in the 3GPP network.

NAS (Non-Access-Stratum): The upper stratum of the control plane between the UE and the MME. It supports mobility management, session management and IP address maintenance between the UE and the network.

AS (Access-Stratum): It includes the protocol stack between the UE and the radio (or access) network and is responsible for transmitting data and network control signals.

In what follows, the present invention will be described based on the terms defined above.

Overview of System to which the Present Invention can be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

FIG. 6 illustrates a physical channel structure in a wireless communication system to which the present invention may be applied.

Referring to FIG. 6, a physical channel delivers signaling and data by using a radio resource comprising one or more subcarriers in the frequency domain and one or more symbols in the time domain.

One subframe having a length of 1.0 ms comprises a plurality of symbols. A specific symbol(s) of a subframe (for example, a first symbol of a subframe) may be used for a PDCCH. The PDCCH carries information about dynamically allocated resources (for example, resource block and MCS (Modulation and Coding Scheme)).

EMM and ECM State

In what follows, EPS Mobility Management (EMM) and EPS Connection Management (ECM) states will be described.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

In addition, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the location of the UE differs from the location recognized by the network while the UE is in the ECM-IDLE state, the UE can inform the network of the corresponding location of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to FDD (Frequency Division Duplex) and TDD (Time Division Duplex) scheme. The random access procedure is independent of a cell size and is also independent of the number of serving cells in case CA (Carrier Aggregation) is configured.

First, a UE performs the random access procedure in the following cases.

The case in which a UE performs initial access in an RRC idle state in the absence of an RRC connection to an eNB The case in which a UE performs an RRC connection re-establishment procedure The case in which a UE connects to a target cell for the first time while performing a handover procedure The case in which a random access procedure is requested by a command from an eNB The case in which downlink data are generated while uplink synchronization is not met in the RRC connected state The case in which uplink data are generated while uplink synchronization is not met in the RRC connected state or a designated radio resource used for requesting a radio resource is not allocated The case in which positioning of a UE is performed while timing advance is needed in the RRC connected state The case in which a recovery process is performed at the time of a radio link failure or handover failure The 3GPP Rel-10 specification takes into account applying a TA (Timing Advance) value applicable to one specific cell (for example, P cell) commonly to a plurality of cells in a wireless access system. However, a UE may combine a plurality of cells belonging to different frequency bands (namely separated with a large distance in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG. Meanwhile, in case of TAG (that is, secondary TAG (sTAG)) that is configured with SCells only, the TA, which is determined based on a specific SCell within sTAG, can be applied to all the cells within the corresponding sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the corresponding sTAG by the UE. Like this, the random access procedure may be performed in SCell as well in order to acquire timing alignment of the sTAG to which the corresponding SCell belongs.

In a process of selecting a random access preamble (RACH preamble), the LTE/LTE-A system supports both of a contention based random access procedure and a non-contention based random access procedure. In the former procedure, a UE selects one arbitrary preamble from a specific set, while, in the latter procedure, the UE uses the random access preamble that an eNB has allocated only to the specific UE. It should be noted, however, that the non-contention based random access procedure may be confined to the handover process described above, a case requested by a command from the eNB, and UE positioning and/or timing advance alignment for sTAG. After the random access procedure is completed, a normal uplink/downlink transmission occurs.

Meanwhile, a relay node (RN) also support both of the contention based random access procedure and the non-contention based random access procedure. When a relay node performs the random access procedure, RN subframe configuration is suspended. That is, this means that the RN subframe configuration is temporarily discarded. Thereafter, the RN subframe structure is resumed at the time when the random access procedure is successfully completed.

FIG. 8 illustrates a contention-based random access procedure in a wireless communication system to which the present invention may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (for example, indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the random access response. A random access response may include an RA preamble index/identifier, UL grant indicating a uplink radio resource, Temporary Cell RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command) used for transmitting a scheduling message (Msg 3) described later. The TPC is used to determine the transmission power for a scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmit through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of 'ra-ResponseWindowSize' starting from a subframe after three subframes in the last subframe transmitting a preamble. In other words, the UE waits to receive a random access response during a random access window secured after three subframes from the subframe completed transmission of the preamble. The UE may obtain the random access window size ('ra-ResponseWindowsize') parameter through system information, and the random access window size is determined to be a value between 2 to 10.

If receiving a random access response having the same random access preamble delimiter/identity as that of the random access preamble transmitted to the eNB, the UE stops monitoring the random access response. On the other hand, if failing to receive a random access response message until a random access response window is terminated or failing to receive a valid random access response having the same random access preamble identity as that of the random access preamble transmitted to the eNB, the UE may consider reception of the random access response as having failed and then perform retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. In case the UE is connected for the first time, an RRC Connection request generated at the RRC layer and transmitted through a CCCH may be included in the Msg 3 and transmitted. And in the case of an RRC Connection Re-establishment procedure, an RRC Connection Re-establishment request generated at the RRC layer and transmitted through the CCCH may be included in the Msg 3 and transmitted. Also, a NAS connection request message may be included in the Msg 3.

The Msg 3 has to include a UE identity. In the case of a contention based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S(SAE)-TMSI or a random number). In most cases, the unique identity is longer than the C-RNTI.

The UE uses UE-specific scrambling for transmission on UL-SCH. In case the UE has received a C-RNTI, the UE may perform scrambling by using the C-RNTI. In case the UE has not received a C-RNTI yet, the UE is unable to perform C-RNTI based scrambling but uses a TC-RNTI received from a random access response instead. If having received data corresponding to the UL grant, the UE initiates a contention resolution timer for resolving contention.

(4) Msg 4 (Message 4)

Receiving the C-RNTI of a UE through the Msg 3 from the corresponding UE, the eNB transmits a Msg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. As one example, the Msg 4 may include an RRC Connection Setup message.

After transmitting data including an identity through a UL grant included in the random access response, the UE waits for a command from the eNB to resolve contention. In other words, two methods are available for a method for receiving the PDCCH, too. As described above, in case the identity in the Msg 3 transmitted in response to the UL grant is the C-RNTI, the UE attempts to receive the PDCCH by using its C-RNTI. In case the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded to transmit their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. On the other hand, if the UE fails to receive a PDCCH indicated by its C-RNTI before the contention resolution timer expires, the UE determines that it has lost the contention and performs the random access process again or inform a upper layer of the failure. The latter contention resolution method, namely the method for transmitting an identity of a successful UE, is used when a UE does not have a unique cell identity before performing the random access process. In other words, in case the UE has no cell identity, the UE transmits data by including an upper identity (S-TMSI or a random number) higher than a cell identity in the data according to the UL grant information included in a random access response and operates a contention resolution timer. In case the data including the upper identity of the UE is transmitted to a DL-SCH before the contention resolution timer expires, the UE determines that the random access process has been performed successfully. On the other hand, in case the data including the upper identity of the UE is not transmitted to the DL-SCH before the contention resolution data expires, the UE determines that the random access process has failed.

Meanwhile, different from the contention based random access process illustrated in FIG. 11, a non-contention based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

5G System Architecture to which the Present Invention May be Applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 9): indicates an interaction between NF services within NFs described by a point-to-point reference point (e.g., N11) between two NFs (e.g., AMF and SMF).

Service-based representation (FIG. 10): network functions (e.g., AMFs) within a control plane (CP) permit other authenticated network functions to access its own service. If this representation is necessary, it also includes a point-to-point reference point.

FIG. 9 is a diagram illustrating 5G system architecture using a reference point representation.

Referring to FIG. 9, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF (SMS(Short Message Service) function), a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The network node in charge of transmission/reception of wireless signals with the UE is the gNB, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 9. In FIG. 9, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roam ing scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF FIG. 10 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.

A complete end-to-end message flow is described by the sequence of NF service invocation.

Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 11 illustrates NG-RAN architecture to which the present invention may be applied.

Referring to FIG. 11, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

FIG. 12 is a diagram illustrating a radio protocol stack to which the present invention may be applied. Specifically, FIG. 12(a) illustrates a radio interface user plane protocol stack between a UE and a gNB, and FIG. 12(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 12(a), the user plane protocol stack may be divided into a first layer (Layer 1) (i.e., a physical layer (PHY) layer) and a second layer (Layer 2).

Referring to FIG. 12(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.

Broadcast control channel (BCCH): a downlink channel system for broadcasting control information.

Paging control channel (PCCH): a downlink channel transferring paging information and system information change notification.

Common control channel (CCCH): a channel for transmitting control information between a UE and a network. This channel is used for UEs not having an RRC connection with a network.

Dedicated control channel (DCCH): a point-to-point bidirectional channel for transmitting dedicated control information between a UE and a network. It is used by a UE having an RRC connection.

ii) The traffic channel is used to use only user plane information:

Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:
Core network control plane and user plane function
NG-RAN
Non-3GPP interworking function (N3IWF) toward a non-3GPP access network A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN. Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:
Slice/service type (SST): the SST indicates the operation of a network slice expected form a viewpoint of a function and service.
Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance. An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(s) allocated to a UE.

If SSC Mode 3 is used, a change of a user plane can be aware by a UE, but a network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

FIG. 13 illustrates RM state models to which the present invention may be applied. Specifically, FIG. 13(a) shows an RM state model within a UE, and FIG. 13(b) shows an RM state model within an AMF.

Referring to FIG. 13, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM-DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to 5GC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

FIG. 14 illustrates CM state models to which the present invention may be applied. Specifically, FIG. 14 (a) illustrates a CM state shift within a UE, and FIG. 14 (b) shows a CM state shift within an AMF.

Referring to FIG. 14, in order to reflect the NAS signaling connection of the UE with the AMF, two CM states of CM-IDLE and CM-CONNECTED are used.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.

In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

In the CM-CONNECTED state, whenever an N2 signaling connection and N3 connection for the UE are released, the AMF enters the CM-IDLE state.

When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state. When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

If an RRC resumption procedure fails,
If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the UE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE Mobility Restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:
RAT restriction: the RAT restriction is defined as a 3GPP RAT(s) whose access of a UE is not permitted. A UE within a restricted RAT is not allowed to initiate any communication with a network based on subscription information.
Forbidden area: a UE is not allowed to initiate any communication with a network based on subscription information within a forbidden area under a specific RAT.
Service area restriction: it defines an area in which a UE can initiate cannot initiate communication with a network as follows:
Allowed area: if a UE is allowed by subscription information within an allowed area under a specific RAT, the UE is allowed to initiate communication with a network.
Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:
The evaluation of the RAT restriction has precedence over the evaluation of any other mobility restriction;
The evaluation of the forbidden area has precedence over the evaluation of the allowed area and the non-allowed area; and
The evaluation of the non-allowed area has precedence over the evaluation of the allowed area.

4) Mobile Initiated Connection Only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.

If a change (e.g., configuration change) within the UE requires registration update to a network
If a periodic registration timer expires
If MO data is pending
If MO (Mobile Originating) signaling is pending
Quality of Service (QoS) Model QoS is a technology for the smooth transfer service of various traffic (mail, data transmission, audio and video) to a user depending on each character.

A 5G QoS model supports a framework-based QoS flow. The 5G QoS model supports both a QoS flow that requires a guaranteed flow bit rate (GFBR) and a QoS flow that does not require the GFBR.

The QoS flow is the finest granularity for QoS classification in a PDU session.

A QoS flow ID (QFI) is used to identify a QoS flow within a 5G system. The QFI is unique within a PDU session. User plane traffic having the same QFI within a PDU session receives the same traffic transfer processing (e.g., scheduling and an admission threshold). The QFI is transferred within an encapsulation header on N3 (and N9). The QFI may be applied to a different payload type of a PDU (i.e., an IP packet, unstructured packet and Ethernet frame).

In this specification, for convenience of description, "QoS" and a "QoS flow" are interchangeably used. Accordingly, in this specification, "QoS" may be construed as meaning a "QoS flow", and "QoS" may be construed as meaning a "QoS flow."

Within a 5G system, QoS flows may be controlled by an SMF upon PDU session setup or QoS flow establishment/modification.

If applicable, all of QoS flows have the following characteristics:
QoS profile previously configured in the AN or provided from the SMF to the AN via the AMF through the N2 reference point;
One or more networks provided from the SMF to the UE via the AMF through the N1 reference point—provided QoS rule(s) and/or one or more UE-derived QoS rule(s)
SDF classification provided from the SMF to the UPF through the N4 reference point and QoS-related information (e.g., session-aggregate maximum bit rate (AMBR)).

The QoS flow may become a "guaranteed bit rate (GBR)" or a "non-guaranteed bit rate (non-GBR)" depending on the QoS profile. The QoS profile of the QoS flow includes the following QoS parameters:

i) With respect to each of QoS flows, QoS parameters may include the followings:
5G QoS indicator (5QI): the 5QI is a scalar for referring to 5G QoS characteristics (i.e., control QoS transfer handling access node-specific parameters for a QoS flow, for example, scheduling weight, an admission threshold, a queue management threshold and a link layer protocol configuration).
Allocation and retention priority (APR): the ARP includes a priority level, a pre-emption capability and pre-emption vulnerability. The priority level defines the relative importance of a resource request. This is used to determine whether a new QoS flow will be accepted or rejected if resources are restricted and to used to determine whether the existing QoS flow will pre-empt resources while the resources are restricted.

ii) Furthermore, only in the case of each GBR QoS flow, QoS parameters may further include the followings:
GFBR—the uplink and downlink;
Maximum flow bit rate (MFBR)—the uplink and downlink; and
Notification control.

iii) Only in the case of a non-GBR QoS flow, QoS parameters may further include the following: Reflective QoS attribute (RQA)

There are supported methods of controlling the following QoS flows:

1) In the case of the non-GBR QoS flow: if a standardized 5QI or a previously configured 5QI is used, a 5QI value is used as the QFI of the QoS flow and a default ARP is previously configured in the AN;

2) In the case of the GBR QoS flow: if a standardized 5QI or a previously configured 5QI is used, a 5QI value is used as the QFI of the QoS flow. A default ARP is transmitted to the RAN when a PDU session is established. Whenever the NG-RAN is used, the user plane (UP) of the PDU session is activated;

3) In the case of the GBR and non-GBR QoS flow: an allocated QFI is used. A 5QI value may be standardized, previously configured or not standardized. The QoS profile and QFI of the QoS flow may be provided to the (R)AN through N2 when a PDU session is established or when a QoS flow is established/changed. Whenever the NG-RAN is used, the user plane (UP) of the PDU session is activated.

A UE may perform the marking and classification (i.e., the association of UL traffic for a QoS flow) of UL user plane traffic based on a QoS rule. Such rules may be explicitly provided to the UE (when a PDU session is established or a QoS flow is established) or may have been previously configured in the UE or may be implicitly derived by the UE by applying reflective QoS.

The QoS rule may include a unique QoS rule ID within a PDU session, the QFI of an associated QoS flow, and one or more packet filters and precedence value. Additionally, with respect to an allocated QFI, the QoS rule may include QoS parameters related to a UE. One or more QoS rules associated with the same QoS flow (i.e., having the same QFI) may be present.

The default QoS rule may be necessary for all of PDU sessions. The default QoS rule may be a unique QoS rule of a PDU session that may not include a packet filter (In this case, the highest precedence value (i.e., the lowest priority) should be used). If the default QoS rule does not include a packet filter, the default QoS rule defines the processing of packets not matched with another QoS rule in a PDU session.

The SMF performs binding between SDFs for a QoS flow depending on the QoS of an SDF and service requirements. The SMF allocates a QFI to a new QoS flow, and derives the QoS parameter of the new QoS flow from information provided by the PCF. If applicable, the SMF may provide an (R)AN with a QFI along with a QoS profile. The SMF provides an SDF template (i.e., a set of packet filters associated with the SDF received from the PCF) along with SDF priority, QoS-related information and corresponding packet marking information (i.e., a QFI, a differentiated services code point (DSCP) value and optionally enables the classification, bandwidth application and marking of user plane traffic using reflective QoS indication for a UPF). If applicable, the SMF generates QoS rule(s) for a PDU session by allocating unique QoS rule IDs within a PDU session to which the QFI of a QoS flow has been added, configuring packet filter(s) for the UL part of the SDF template, and setting QoS rule priority in the SDF priority. The QoS rule is provided to a UE that enables the classification and marking of UL user plane traffic.

FIG. 15 illustrates classification and user plane marking for a QoS flow and the mapping of a QoS flow to AN resources according to an embodiment of the present invention.

1) Downlink

An SMF allocates a QFI for each QoS flow. Furthermore, the SMF derives QoS parameters from information provided by a PCF.

The SMF provides an (R)AN with the QFI along with a QoS profile including the QoS parameters of a QoS flow. Furthermore, when a PDU session or QoS flow is established, the QoS parameters of the QoS flow is provided to the (R)AN as the QoS profile through N2. Furthermore, whenever an NG-RAN is used, a user plane is activated. Furthermore, QoS parameters may be previously configured in the (R)AN for a non-GBR QoS flow.

Furthermore, the SMF provides an UPF with an SDF template (i.e., a set of packet filters associated with the SDF received from the PCF) along with SDF preference and a corresponding QFI so that the UPF can perform the classification and marking of a downlink user plane packet.

Downlink inflow data packets are classified based on the SDF template according to the SDF preference (without the initiation of additional N4 signaling). A CN classifies user plane traffic belonging to a QoS flow through N3 (and N9) user plane marking using the QFI. The AN binds the QoS flow with AN resources (i.e., a DRB in the case of the 3GPP RAN). In this case, a relation between the QoS flow and the AN resources is not restricted to 1:1. The AN may configure the AN resources necessary to map a QoS flow to a DRB so that a UE may receive the QFI (and reflective QoS may be applied).

If matching is not discovered, when all of QoS flows are related to one or more DL packet filters, the UPF may discard a DL data packet.

Characteristics applied to process downlink traffic are as follows:

The UPF maps user plane traffic to the QoS flow based on the SDF template.

The UPF performs session-AMBR execution and performs PDU counting for charging support.

The UPF may transmit the PDUs of a PDU session in a single tunnel between 5GC and the (A)AN, and the UPF may include the QFI in an encapsulation header.

The UPF performs transmission level packet marking in the downlink (e.g., sets DiffSery code in an outer IP header). Transmission level packet marking is based on 5QI and the ARP of an associated QoS flow.

The (R)AN maps PDUs from a QoS flow to access-specific resources based on a QFI, related 5G QoS characteristics and parameters by considering an N3 tunnel associated with a downlink packet.

If reflective QoS is applied, a UE may generate a new derived QoS rule (or may be called a "UE-derived QoS rule"). A packet filter within the derived QoS rule may be derived from a DL packet (i.e., the header of the DL packet). The QFI of the derived QoS rule may be configured depending on the QFI of the DL packet.

2) Uplink

The SMF generates QoS rule(s) for a PDU session by allocating a QoS rule ID, adding the QFI of a QoS flow, setting packet filter(s) in the uplink part of an SDF template, and setting QoS rule precedence in SDF precedence. The SMF may provide a UE with the QoS rules in order for the UE to perform classification and marking.

The QoS rule includes a QoS rule ID, the QFI of a QoS flow, one or more packet filters and preference values. The same QFI (i.e., the same QoS flow) and one or more QoS rules may be associated.

A default QoS rule is required for each PDU session. The default QoS rule is the QoS rule of a PDU session not including a packet filter (In this case, the highest precedence value (i.e., the lowest priority) is used). If the default QoS rule does not include a packet filter, the default QoS rule defines the processing of a packet not matched with any another QoS rule within the PDU session.

The UE performs the classification and marking of uplink user plane traffic. That is, the UE associates uplink traffic with the QoS flow based on the QoS rule. The rule may be explicitly signaled through N1 (when a PDU session is established or when a QoS flow is established or may be previously configured in the UE or may be implicitly derived by the UE from reflected QoS.

In the UL, the UE evaluates an UL packet with respect to the packet filter of the QoS rule based on the precedence value of the QoS rule (i.e., in order of increasing precedence value) until a matching QoS rule (i.e., the packet filter is matched with the UL packet) is discovered. The UE binds the UL packet to the QoS flow using a QFI in the corresponding matching QoS rule. The UE binds the QoS flow and the AN resources.

If matching is not discovered and a default QoS rule includes one or more UL packet filters, the UE may discard an UL data packet.

Characteristics applied to process uplink traffic are as follows:

A UE may use stored QoS rules in order to determine mapping between UL user plane traffic and a QoS flow. The UE may mark an UL PDU with the QFI of a QoS rule including a matching packet filter, and may transmit the UL PDU using corresponding access-specific resources for a QoS flow based on mapping provided by an RAN.

The (R)AN transmits the PDU through an N3 tunnel with respect to an UPF. When an UL packet passes through a CN from the (R)AN, the (R)AN includes a QFI in the encapsulation header of the UL PDU and selects the N3 tunnel.

The (R)AN may perform transmission level packet marking in the uplink. The transmission level packet marking may be based on the ARP of a QoS flow associated with a 5QI.

A UPF checks whether the QFIs of UL PDUs are provided to the UE or are aligned (e.g., in the case of reflective QoS) with QoS rules implicitly derived by the UE.

The UPF performs session-AMBF execution and counts a packet for charging.

In the case of an UL classifier PDU session, UL and DL session-AMBRs need to be performed on an UPF that supports an UL classifier function. Furthermore, the DL session-AMBR needs to be separately performed in all of UPFs that terminate an N6 interface (i.e., an interaction between UPFs is not required).

In the case of a multi-home PDU session, UL and DL session-AMBRs are applied to an UPF that supports a branch point function. Furthermore, the DL session-AMBR needs to be separately performed in all of UPFs that terminate the N6 interface (i.e., an interaction between UPFs is not required).

The (R)AN needs to perform a maximum bit rate (UE-AMBR) restriction in the UL and DL for each non-GBR QoS flow. When the UE receives a session-AMBR, it needs to perform a PDU session-based UL rate restriction for non-GBR traffic using the session-AMBR. The rate restriction execution for each PDU session is applied to a flow that does not require a guaranteed flow bit rate. The MBR per SDF is mandatory to a GBR QoS flow, but is optional for a non-GBR QoS flow. The MBR is performed in the UPF.

QoS control for an unstructured PDU is performed in a PDU session level. When the PDU session is established for the transmission of the unstructured PDU, the SMF provides the UPF and the UE with a QFI to be applied to any packet of the PDU session.

GUTI (Globally Unique Temporary UE Identity)

The purpose of the GUTI is to provide an unambiguous identification of the UE without revealing the permanent identification of the UE or user in the EPS. The GUTI may also be used to identify the MME and the network. The GUTI can be used to establish the identity of the UE by the network and the UE during signaling between the network and the UE in the EPS (see 3GPP TS 23.401 [72]).

The GUTI has two main components:

One is an element that uniquely identifies the MME to which the GUTI is allocated; and The other is an element that uniquely identifies the UE within the MME to which the GUTI is allocated.

Within the MME, the UE should be identified by M (MME)—TMSI (Temporary mobile subscriber identity).

The globally unique MME identifier (GUMMEI) may be composed of MCC (mobile country code), MNC (mobile network code) and MMEI (MMEI identifier).

The MMEI may be composed of an MME group ID (MMEGI) and an MME code (MMEC).

The GUTI may be composed of GUMMEI and M-TMSI.

For paging purposes, the UE may be paged to the S-TMSI. S-TMSI can be composed of MMEC and M-TMSI.

The operator should ensure that the MMEC is unique within the MME pool area and, if a redundant pool area is in use, the operator should ensure that the redundant pool area is unique within the overlapping MME pool area.

In case of sharing some networks, the MMEC and NRI values should be coordinated between the shared operators as described in 3GPP TS 23.251 [101]. To achieve circuit-switched (CS)/packet-switched (CS) coordination in a shared GERAN/UTRAN network, the MMEC included in the GUTI can be configured to identify the CS operator servicing the UE.

The GUTI may be used to support subscriber identity confidentiality and to enable more efficient wireless signaling procedures (e.g., paging and service requests) in the shortened S-TMSI format.

The format and size of the GUTI are as follows:
<GUTI>=<GUMMEI><M-TMSI>,
<GUMMEI>=<MCC><MNC><MME identifier>
<MME identifier>=<MME group ID><MME code>

The MCC and the MNC should have the same field size as the existing 3GPP system.

The M-TMSI may have a 32-bit length.

The MME group ID may have a 16-bit length.

The MME code should be 8 bits long.

E-UTRAN to UTRAN Iu Mode Inter-RAT Handover

1. Pre-Conditions:

The UE is in the ECM-CONNECTED state (E-UTRAN mode).

If an emergency bearer service for the UE is in progress, handover to the target RNC is performed independently of the handover restriction list. The SGSN checks whether the handover is in the restricted area as part of the routing area update in the execution phase, and if so, the SGSN deactivates the non-emergency PDP context.

If the emergency bearer service for the UE is in progress, the source MME evaluates the handover to the target CSG cell independently of the CSG subscription of the UE. If the handover is for a CSG cell to which the UE is not subscribed, the target RNC only accepts the emergency bearer, and the target SGSN deactivates the non-emergency PDP context not accepted by the target RNC.

2. Preparation Phase

FIG. 16 is a flowchart illustrating an E-UTRAN to UTRAN Iu mode inter-RAT HO (Handover) preparation phase that may be applied to the present invention.

1. The source eNodeB decides to initiate an inter-RAT handover to the UTRAN Iu mode which is the target access network. At this point, both the uplink and downlink user data are transmitted through the GTP tunnel between the bearer between the UE and the source eNodeB, the source eNodeB, the serving GW and the PDN GW.

If the UE has an emergency bearer service in progress, the source eNodeB should not initiate a PS handover to the UTRAN cell without IMS voice capability.

2. The source eNodeB sends Handover Required (S1AP Reason, Target RNC Identifier, CSG ID, CSG Access Mode, Source to Target Transparent Container) message to the source MME to request the CN to set the resources within the target RNC, the target SGSN and the serving GW. The bearer to be the data forwarding target is identified by the target SGSN at a later stage (see step 7 below). When the target cell is a CSG cell or a hybrid cell, the source eNodeB should contain the CSG ID of the target cell. If the target cell is a hybrid cell, the CSG access mode should be displayed.

3. The source MME determines from the "target RNC identifier" IE that the handover type is IRAT handover to UTRAN Iu mode. The source MME selects the target SGSN for the "SGSN Selection Function" as described in Section 4.3.8.4. The source MME sends a forward relocation request (IMSI, target identification, CSG ID, CSG membership indication, MM context, PDN connection, MME tunnel endpoint identifier for the control plane, MME address for control plane, a source to target transparent container, RAN reason, (if possible) MS Info change reporting action, (if possible) CSG information reporting action, UE time zone, ISR supported serving network) message to the target SGSN to thereby start the handover resource allocation procedure. If the source MME and the associated serving GW are able to activate the ISR for the UE, the ISR Supported information is displayed. When the ISR is activated, a message should be sent to the SGSN that maintains the ISR for the UE when this SGSN serves the target identified by the target identification. This message includes all PDN connections activated in the source system and includes the associated APN, address and uplink tunnel endpoint parameters of the serving GW to the control plane for each PDN connection and a list of EPS bearer contexts. The RAN reason indicates the S1 AP reason received at the source eNodeB. The previous serving network is sent to the target MME to support the target MME to determine when the serving network is changed.

The source MME should check the UE's CSG subscription to perform access control when the CSG ID is provided by the source eNodeB. If there is no subscription data for this CSG ID or CSG subscription, and the target cell is a CSG cell, then the source MME should refuse the handover for an appropriate reason unless the UE has an emergency bearer service.

The source MME includes a CSG ID in the forward relocation request when the target cell is a CSG cell or a hybrid cell. If the target cell is a hybrid cell or there is more than one emergency bearer and the target cell is the CSG cell, a CSG membership indication indicating whether the UE is a CSG member is included in a Forward Relocation Request message.

The MM context includes information about the EPS bearer context. The source MME does not contain EPS bearer context information for the "non-IP" bearer or SCEF connection. If the selected target SGSN cannot support the UE's EPS bearer, the source MME rejects the handover attempt by sending a handover preparation failure (reason) message to the source eNodeB.

If the handover is successful, the source MME may signal the SGW and/or SCEF to release any non-included EPS bearer after step 6 of the execution procedure. The non-embedded bearer is locally released by the UE after bearer context state synchronization occurring during the routing area update in step 10 of the execution procedure.

The target SGSN maps the EPS bearer to the PDP context on a one-to-one basis and maps the EPS bearer QoS parameter value of the EPS bearer to the Release 99 QoS parameter value of the bearer context defined in Appendix E.

Prioritization of the PDP contexts is performed by the target core network node, i.e., the target SGSN.

The MM context includes a supported encryption algorithm such as security related information.

The target SGSN should determine the maximum APN limit based on the APN limit of each bearer context in the forward relocation request and then store the new maximum APN limit value.

In an architecture with a stand-alone GW, if SIPTO of the local network is activated for a PDN connection, the source MME should include the local home network ID of the source cell in the PDN connection corresponding to SIPTO in the local network PDN connection.

4. The target SGSN determines, for example, whether the serving GW should be relocated due to the PLMN change. When the serving GW is to be relocated, the target SGSN selects the target serving GW for the "Serving GW Selection Function" as described in Section 4.3.8.2, and sends a session creation request message (IMSI, an SGSN tunnel endpoint identifier for the control plane, an SGSN address for the user plane, a PDN GW address for the user plane, a PDN GW TEID for the user plane, a PDN GW UL TEID for the user plane, a PDN GW address for the control plane, and a PDN GW TEID for the control plane, a protocol type through S5/S8, a serving network). The protocol type through S5/S8 is provided to the serving GW, and the protocol should be used via the S5/S8 interface.

The target SGSN establishes the EPS bearer context in the displayed order. The SGSN deactivates the EPS bearer context which cannot be set, as provided in step 7 of the execution phase.

4a. The target serving GW allocates its local resources and returns a Create Session Response (Serving GW address for the user plane, Serving GW UL TEID for the user plane, Serving GW address for the control plane, Serving GW TEID for the control plane) message to the target SGSN.

5. The target SGSN sends a message relocatoin request (UE identifier, reason, CN domain indicator, integrity protection information (i.e., IK and allowed integrity protection algorithm), RAB to become a setting list, CSG ID, a CSG membership indication, a source RNC to a target RNC transparent container, a service handover-related information), to thereby request the RCN to set radio network resources (RABs). If an access restriction exists in the MM context, the service handover-related information for the rearrangement request message should be included in the target SGSN in order for the RNC to restrict the UE of the connection mode by the handover to the RAT prohibited by the access restriction.

Information such as a RAB ID, a RAB parameter, a transport layer address, and a Iu transport association should be included per RAB that is requested to be set. The RAB ID information element includes an NSAPI value, and the RAB parameter information element provides a QoS profile. The transport layer address is the serving GW address for the user plane (if a direct tunnel is used) or the SGSN address for the user plane (if no direct tunnel is used) and the Iu transport association corresponds to the uplink tunnel terminal identifier data.

The decryption and integrity protection key is transmitted to the target RNC so that data transmission can continue in the new RAT/mode target cell without requiring a new AKA (authentication and key agreement) procedure. Information to be transmitted from the RRC of the target RNC to the UE (after the relocatoin command message or the handover complete message) should be included in the RRC message transmitted from the target RNC to the UE via the transparent container.

If provided by the source MME in the forward relocation request message, the target SGSN should include a CSG ID and CSG membership indication.

The target RNC radio and Iu user plane resources are reserved for the allowed RABs. "Cause" indicates the RAN reason received from the source MME. The source RNC to target RNC transparent container contains the value from the source received at the source eNodeB to the target transparent container.

If the target cell is a CSG cell, then the target RNC should verify the CSG ID provided by the target SGSN and reject the handover for the appropriate reason if it does not coincide with the CSG ID for the target cell. If the target cell is in hybrid mode, the target RNC may perform differentiated processing for the CSG and non-CSG members using the CSG membership indication. If the target cell is a CSG cell and the CSG membership indication is "non-member", then the target RNC only allows emergency bearers.

5a. The target RNC allocates resources and returns the corresponding parameters to the target SGSN in the message Relocation Request Acknowledge (target RNC to source RNC transparent container, RAB setting list, setting failed RAB list) message.

When transmitting the relocation request confirmation message, the target RNC should be ready to receive the downlink GTP PDU from the serving GW for the allowed RAB, or from the target SGSN if the direct tunnel is not used.

Each RAB configuration list is defined by a Iu transport association corresponding to a transport layer address which is the target RNC address for user data and a downlink tunnel endpoint identifier for user data.

Any EPS bearer context for which the RAB is not set is maintained and managed at the target SGSN and the UE. This EPS bearer context is deactivated by the target SGSN through an explicit SM procedure upon completion of the Routing Area Update (RAU) procedure.

6. If "Indirect forwarding" and relocation of the serving GW are applied and the direct tunnel is used, the target SGSN sends an indirect data forwarding tunnel request message (target RNC address and TEID for DL data forwarding) to the serving GW. If "indirect forwarding" and relocation of the serving GW are applied and the direct tunnel is not used, the target SGSN sends an indirect data forwarding tunnel request message (SGSN address and TEID for DL data forwarding) to the serving GW.

Indirect forwarding may be performed through a serving GW different from the serving GW used as an anchor point for the UE.

6a. The Serving GW returns an Indirect Data Forwarding Tunnel Response (Reason, Serving GW Address and Serving GW DL TEID) message to the target SGSN.

7. The target SGSN sends the message forward relocation response (reason, SGSN tunnel endpoint identifier for the control plane, SGSN address for the control plane, target-to-source transparent container, reason, RAB setup information, additional RAB setup information, address and TEID user traffic data forwarding, serving GW change indication) to the source MME. The serving GW change indication indicates that a new serving GW has been selected. The target-to-source transparent container contains a value from the target RNC to the source RNC transparent container received from the target RNC.

IE "address(es) and TEID" for user traffic data forwarding define the target tunneling endpoint for data forwarding in the target system and are set as follows.

If "direct forwarding" is applied, or "indirect forwarding" and relocation of the serving GW are not applied and the direct tunnel is used, the IE address(es) for user traffic data forwarding and the TEID include GTP-U tunnel endpoint parameters and addresses to the target RNC received in step 5a.

If "Indirect forwarding" and relocation of the serving GW are applied, the IE address(es) and TEID for user traffic data forwarding include the DL GTP-U tunnel endpoint parameters and address for the serving GW received in step 6. This is independent of direct tunnel use.

If "Indirect forwarding" is applied and no direct tunnel is used and the serving GW relocation is not applied, the IE address(es) for user traffic data forwarding and TEID should contain the DL GTP-U tunnel endpoint parameters.

8. When "Indirect forwarding" is applied, the source MME sends a Message Generation Indirect Data Forwarding Tunnel Request (address(es) and TEID(s) for data forwarding (received in step 7), EPS bearer ID(s)) to the serving GW used for indirect forwarding.

Indirect forwarding may be performed via a serving GW different from the serving GW used as an anchor point for the UE.

8a. The Serving GW returns a forwarding parameter by sending a message Create Indirect Data Forwarding Tunnel Response (reason, serving GW address(es) and TEID(s) for data forwarding). If the serving GW does not support data forwarding, the appropriate reason value should be returned and the serving GW address(es) and TEID(s) are not included in the message.

3. Execution Phase

FIG. 17 is a flowchart illustrating an E-UTRAN to UTRAN Iu mode inter-RAT HO (Handover) execution phase according to an embodiment of the present invention.

In the case of the PMIP-based S5/S8 procedure, steps (A) and (B) are defined in TS 23.402 [2]. Step (B) shows PCRF interaction in the case of PMIP-based S5/S8. Steps 8 and 8a relate to GTP based S5/S8.

The source eNodeB continuously receives the downlink and uplink user plane PDUs.

1. The source MME completes the preparatory steps for the source eNodeB by sending it to the message handover command (the target-to-source transparent container, the E-RAB that is the release list, and the bearer that is the subject of the data forwarding list). The "bearers that are the targets of the data forwarding list" may be included in the message, and in the case that "direct forwarding" is applied, this should be the list of address(es) and TEIS(s) for forwarding the user traffic data received at the target side in the preparation phase (preparation phase 7), and in the case that "indirect forwarding" is applied, the parameters received in step 8a of the preparation phase are applied.

The source eNodeB initiates data forwarding for the bearer specified in the "bearers that are the subject of the data forwarding list". Data forwarding may proceed directly to the target RNC, or alternatively may proceed through the serving GW if determined by the source MME and/or the target SGSN in the preparation phase.

2. The source eNodeB will command the UE to handover from the E-UTRAN command through the message HO to the target access network. This message includes a transparent container containing radio aspect parameters which are set by the target RNC in the preparation phase. The details of this E-UTRAN specific signaling are described in TS 36.300 [5].

When receiving the HO from the E-UTRAN command message containing the handover command message, the UE should associate bearer IDs with respective RABs based on the relationship with the NSAPI and stop the uplink transmission of the user plane data.

4. The UE moves to the target UTRAN Iu (3G) system and performs the handover according to the parameters provided in the message delivered in step 2. The procedure is identical to steps 6 and 8 of Section 5.2.2.2 [8] of TS 43.129 with the additional association of the existing Bearer Ids related with a particular NSAPI with received RABs.

The UE may resume transmitting user data only for NSAPIs with radio resources allocated to the target RNC.

5. If the new source RNC-ID+S-RNTI is successfully exchanged with the UE, the target RNC should send a Relocation Complete message to the target SGSN. The purpose of the relocation completion procedure is to mark the completion of the relocation from the source E-UTRAN to the RNC by the target RNC. After receiving the relocation complete message, the target SGSN should be ready to receive data from the target RNC. Each uplink N-PDU received by the target SGSN is sent directly to the serving GW.

In the case of SIPTO of a local network with a standalone GW architecture, the target RNC should include the local home network ID of the target cell in the relocation complete message.

6. Thereafter, the target SGSN then knows that the UE has reached the target side and the target SGSN notifies the source MME by sending a Forward Relocation Complete Notification message (ISR activation, serving GW change) message. If instructed, the activated ISR instructs the source MME to maintain the UE context and activate the ISG, which is possible only if the S-GW has not been changed. The source MME also acknowledges the information. The timer of the source MME is started to monitor when the source serving GW (for serving GW relocation) and the resources of the source eNodeB are released.

If the timer expires and the activated ISR is not indicated by the target SGSN, then the source MME releases all bearer resources of the UE. When a serving GW change is directed and this timer expires, the source MME deletes the EPS bearer resources by sending a Delete Session Request (reason, operation indication) message to the session serving GW. An operation indication flag indicating that the source serving GW should not start the deletion procedure for the PDN GW is not set. If the ISR is activated before this procedure, the reason is that the source S-GW instructs the source-GW to delete the bearer resources for the other old CN node by sending a delete bearer request message to the corresponding CN node.

When receiving the forward retransmission completion confirmation message, the target SGSN starts a timer when the target SGSN has allocated S-GW resources for indirect forwarding.

For all bearers that were not included in the forward relocation request message sent in step 3, the MME releases the bearer by sending a delete bearer command to the SGW or by sending an appropriate message to the SCEF.

7. The target SGSN will complete the handover procedure by notifying the serving GW (which may be the target serving GW) that the target SGSN is now responsible for all the EPS bearer contexts configured by the UE (for serving GW relocation). This is performed for each PDN connection in the message bearer modification request ((if the direct tunnel is not used) the SGSN address(es) and TEID(s) for user traffic for the allowed EPS bearers, the SGSN tunnel endpoint identifier for the control plane, SGSN address for the control plane, NSAPI(s), or (if direct tunnel is used) RNC address(s) and TEID(s) for the user traffic for the allowed EPS bearers, and RAT type, activated ISR). Because of the mobility from the E-UTRAN, if the target SGSN supports the location information change report regardless of whether the location information change report was requested by the PGW in the previous RAT, the target SGSN should include the user location inform in the Modify Bearer Request (depending on the supported granularity). If the PDN GW requests user CSG information (determined from the UE context), the SGSN also includes a user CSG information IE in this message. If the UE time zone is changed, the SGSN includes the UE time zone IE in this message. If the Serving GW is not relocated but the serving network has changed or the SGSN has not received any previous serving network information from the previous MME, the SGSN includes a new serving network IE in this message. In a network sharing scenario, the serving network represents a serving core network. If indicated, the activated ISR information indicates that the ISR is activated, which is possible only if the S-GW has not been changed. If the modified bearer request does not indicate that the ISR is activated and the S-GW is not changed, the S-GW deletes the ISR resources by sending a bearer delete request to another CN node having bearer resources of the reserved S-GW.

The SGSN releases the non-allowed EPS bearer context by triggering a bearer context deactivation procedure. When the Serving GW receives the DL packet for the non-allowed bearer, the Serving GW drops the DL packet and does not send the downlink data notification to the SGSN.

8. The serving GW (which will be the target serving GW) (for serving GW relocation) sends a message modification bearer request to the PDN GW(s) for each PDN connection, to thereby inform of, for example, GW relocation or change of RAT type which may be used for the charging. If existing in step 7, the S-GW also includes a user location information IE and/or a UE time domain IE and/or a user CSG information IE. If these are received in step 4 or step 7 of section 5.5.2.1.2, the serving network should be included. In the case of the serving GW relocation, the serving GW may allocate a DL TEID via S5/S8 for the non-allowed bearer and include a PDN billing suspend support indication. The PDN GW should acknowledge the request by using the message modification bearer response. In the case of serving GW relocation, the PDN GW updates its Context field and returns a modified bearer response ((if it is selected to enable the PDN GW) a billing Id, MSISDN, PDN billing suspend enable indication). If the PDN GW is stored in the UE context, the MSISDN is included. If a location information change report is requested and supported at the target SGSN, the PGW should provide MS Info change reporting action to the modified bearer response.

If the PCC infrastructure is used, the PDN GW informs the PCRF of, for example, a change in the RAT type.

If the Serving GW is relocated, the PDN GW should send one or more "end marker" packets on the previous path immediately after switching the path. The source serving GW should forward the "end marker" packet to the source eNodeB.

9. The Serving GW (which will be the target Serving GW) (for serving GW relocation) acknowledges the user plane switch to the target SGSN through a Bearer Response Modification message (Reason, GW tunnel endpoint identifier for the control plane, Serving GW Address for the control plane, Info change report action). At this step, the user lane path is set for all the EPS bearer contexts between the UE, the target RNC and the target SGSN, the serving GW (which will be the target serving GW) (for serving GW relocation) and the PDN GW.

If the Serving GW is not changed, the serving GW should send one or more "end marker" packets over the previous path immediately after switching the path.

10. If the UE recognizes that its current routing area is not registered in the network or if the TIN of the UE indicates "GUTI", the UE starts a routing area update procedure informing that the UE is located in the new routing area, together with the target SGSN. The RAN function provides routing area information to the PMM-CONNECTED UE.

Since the bearer context(s) have been received by the handover messages, the target SGSN knows that an IRAT handover has been performed for this UE, so the target SGSN only performs a subset of the RAU procedure, and specifically the context transfer procedures between the source MME and the target SGSN Context are excluded.

With respect to UEs supporting CIoT EPS optimization, the UE uses the bearer state information in the RAU grant to identify any non-transport bearers that need to be released locally.

11. If the timer started in step 6 expires, the source MME sends a release resource message to the source eNodeB. The source eNodeB releases resources associated with the UE.

When the timer started in step 6 expires and the source MME receives the Serving GW change indication in the forward relocation response message, it deletes the EPS bearer resources by sending a delete session request (reason, action indication) message to the source serving GW. The operation indication flag indicating that the source serving GW should not start the deletion procedure for the PDN GW is not set. The source serving GW acknowledges using delete session response (reason) messages. If the ISR is activated prior to this procedure, the source S-GW sends the delete bearer request messages to the corresponding CN node, indicating to the source S-GW why the source S-GW should delete bearer resources for other previous CN nodes.

12. If indirect forwarding has been used, the source MME is triggered to send an indirect data forwarding tunnel request deletion message to the S-GW to release the temporary resources used for indirect forwarding due to expiration of the timer at the source MME initiated at step 6.

13. If indirect forwarding is used and the serving GW is relocated, the target SGSN triggers a Delete Indirect Data Forwarding Tunnel Request message to be sent to the target S-GW due to the expiration of the timer at the target SGSN initiated at step 6, and the temporary resources used for indirect forwarding are released.

FIG. 18 is a flowchart illustrating an E-UTRAN to UTRAN Iu mode inter-RAT HO (Handover) rejection according to an embodiment of the present invention.

The target RNC may deny the use of the handover procedure if the requested RABs in the Relocation Request message cannot be established. In this case, no UE context is set and no resources are allocated to the target SGSN/RNC. The UE remains in the source eNodeB/MME.

1. Steps 1 to 5 of this flowchart are as described above in the preparation phase.

6. If the subject RNC fails to allocate resources to any of the requested RABs, it sends a Relocation Failure (reason) message to the target SGSN. When the target SGSN receives the relocation failure message from the target RNC, the target SGSN clears any reserved resources for this UE.

7. This step is performed only if the serving GW relocation, i.e., step 4/4a, has been performed. The target SGSN deletes the EPS bearer resource by sending a delete session request (reason) message to the session serving GW. The target serving GW acknowledges with delete session response (cause) messages.

8. The target SGSN sends a forward relocation response (reason) message to the transmitting MME.

9. When the source MME receives the forward relocation response message, it sends a handover preparation failure (reason) message to the source eNodeB.

UTRAN Iu Mode to E-UTRAN Inter-RAT Handover

The UTRAN Iu mode to E-UTRAN inter-RAT handover procedure is performed when the network decides to perform handover. The decision to perform a PS handover from the UTRAN Iu mode to the E-UTRAN is made by the network based on the radio state measurements reported to the UTRAN RNC by the UE.

If an emergency bearer service is in progress for the UE, then the MME confirms in the execution phase as part of a Tracking Area Update if the handover is in a restricted area, and if so, the MME releases the non-emergency bearer.

If an emergency bearer service is in progress for the UE, the source SGSN evaluates the handover to the target CSG cell independently of the CSG subscription of the UE. If the handover is for a CSG cell to which the UE is not subscribed, the target eNodeB only allows the emergency bearer and the target MME releases the non-emergency PDN connection which is not allowed by the target eNodeB, as specified in Section 5.10.3.

1. Preparatory Step

FIG. 19 is a flowchart illustrating a UTRAN Iu mode to E-UTRAN inter-RAT HO (handover) preparation phase according to an embodiment of the present invention.

1. The source RNC decides to initiate an inter-RAT handover to the E-UTRAN. At this point, both the uplink and downlink user data are transmitted through: a bearer between the UE and the source RNC, GTP tunnel(s) between the source RNC and the source SGSN (only if a direct tunnel is not used), GTP tunnel(s) between serving GW and PDN GW.

2. The source RNC sends a relocation request (Reason, Target eNodeB Identifier, CSG ID, CSG Access Mode, Source RNC Identifier, Source RNC to Target RNC Transparency Container) message to the source SGSN to request the CN to set resources to the target eNodeB, the target MME, and the serving GW. The bearer to be the subject of the data forwarding is identified by the target MME at a later stage (see step 7 below). If the target cell is a CSG cell or a hybrid cell, the source RNC should include the CSG ID of the target cell. If the target cell is a hybrid cell, the CSG access mode should be indicated.

3. The source SGSN determines from the "target eNodeB Identifier" IE that the type of handover is an IRAT handover to the E-UTRAN. The source SGSN selects the target MME as described in Section 4.3.8.3 of the "MME Select Function". The source SGSN transmits a forward relocation request (IMSI, target identification, CSG ID, CSG membership indication, MM context, PDN connection, SGSN tunnel endpoint identifier for control plane, SGSN address for control plane, source to target transparent container, RAN reason (If possible) MS Info change reporting action, (if possible) CSG information reporting action, UE time zone, ISR support, serving network, and a change to be reported (if existing)) message to the target MME to thereby start the handover resource allocation procedure. This message includes all EPS bearer contexts corresponding to all bearers configured in the source system and uplink tunnel endpoint parameters of the serving GW. If the ISR support information is displayed, this indicates that the source SGSN and the associated serving GW can activate the ISR for the UE. When the ISR is activated, a message that maintains the ISR for the UE should be sent to the MME if this MME is serving the target identified by the Target Identification. The RAN reason indicates the reason for being received at the source RNC. The source to target transparent container contains the value of the source RNC for the target RNC transparent container received from the source RNC. The previous serving network is sent to the target MME to support a target MME that is determined when the serving network is changed.

If the time zone of the UE or a change in the serving network or a change report to the serving GW/PDN GW is deferred by the source SGSN, a change flag by the SGSN to the source is included.

The source SGSN should perform access control by verifying the CSG subscription of the UE if the CSG ID is provided by the source RNC. If the subscription data or CSG subscription for this CSG ID expires and the target cell is a CSG cell, then the source SGSN should refuse the handover for a good reason if the UE does not have emergency bearer service.

The source SGSN includes the CSG ID in the forward relocation request if the target cell is a CSG cell or a hybrid cell. If the target cell is a hybrid cell or there is more than one emergency bearer and the target cell is a CSG cell, a CSG membership indication indicating whether the UE is a CSG member is included in the forward relocation request message.

This message includes all the PDN connections activated in the source system and the associated APN for each PDN connection, the address of the serving GW to the control plane and the uplink tunnel endpoint parameters and the EPS bearer context list.

Prioritization of the EPS bearer context is performed at the target core network node.

The MM context includes the used UMTS integrity and encryption algorithm(s) as well as the key, like security related information, UE network functions and information storage for, e.g., MME.

The target MME selects the NAS encryption and integrity algorithm to be used. This algorithm is transparently transmitted from the target eNodeB to the UE of the target-to-source transparent container (EPC portion).

The MME sets the EPS bearer according to the priority. The MME deactivates the unconfigured EPS bearer, as provided in step 8 of the execution phase.

The target MME should determine the maximum APN limit based on the APN limit of each bearer context received in the forward relocation request and then store a new maximum APN limit value.

In an architecture having a standalone GW, if SIPTO is activated for a PDN connection in the local network, the source SGSN should include the local home network ID of the source cell in the PDN connections corresponding to SIPTO in the local network PDN connection.

4. The target MME determines, for example, whether the Serving GW should be relocated due to the PLMN change. When the serving GW is relocated, the target MME selects the target serving GW via the "Serving GW Select Function" as described in Section 4.3.8.2. The target MME has a generation session request message (IMSI, MME address and TEID, MME tunnel endpoint identifier for the control plane, MME address for the control plane, PDN GW address(es) for the user plane, UL TEID(s), PDN GW address for the control plane, PDN GW TEID for the control plane, protocol type via S5/S8, serving network) to the target serving GW. Information on which protocol should be used via the S5/S8 interface is provided to the Serving GW via the protocol type via S5/S8.

4a. The target serving GW allocates its own local resources and sends a generation session response (serving GW address(es) for the user plane, serving GW UL TEID(s) for the user plane, serving GW address for the control plane, the serving GW TEID for the control plane) message to the target MME.

5. The target MME transmits a message handover request (UE identifier, S1AP reason, KeNB, allowed AS integrity protection and encryption algorithm, NAS security parameters, E-UTRAN, EPS bearer(s) setting list, CSG ID, CSG membership indication, Source to target transparent container) to request the target eNodeB to set up the bearer(s). NAS security parameters for E-UTRAN include NAS integrity protection and encryption algorithms and eKSI and NONCEMME are targeted at the UE. The S1AP reason indicates the RAN reason received from the source SGSN. The source to target transparent container contains the value of the RAN transparent container received from the source SGSN.

The target MME extracts K'ASME from CK and IK in the MM context and associates with eKSI and selects the NAS integrity protection and encryption algorithm(s). The MME and the UE extract NAS keys and KeNB from the K'ASME. If the MME shares the EPS security association with the UE, the MME can activate the original EPS security context by initiating the NAS SMC procedure after completing the handover procedure.

The "IE bearer to be setup" IE should contain information such as ID, bearer parameters, transport layer address, "data forwarding disabled" indication and S1 transport association. The target MME ignores the Activity Status Indicator in the EPS bearer context and requests the target eNodeB to allocate resources for all EPS bearer contexts received at the source side. The transport layer address is the serving GW address for user data, and the S1 transport association corresponds to the uplink tunnel endpoint identifier data. If the target MME determines that the bearer is not subject to data forwarding, the "data forwarding disabled" indication is included.

If provided by the source SGSN in the handover request message, the target MME should include a CSG ID and a CSG membership indication.

The information about the selected NAS encryption and integrity protection algorithm(s), KSI and NONCEMME is transparently transmitted from the target eNodeB to the UE in the target-to-source transparent container and transmitted to the message UTRAN HO command from the source RNC to the UE. This allows the data transmission to continue in the new RAT/mode target cell without a new Authentication and Key Agreement (AKA) procedure.

If the target cell is a CSG cell, the target eNodeB should verify the CSG ID provided by the target MME and reject the handover for the appropriate reason if it does not coincide with the CSG ID for the target cell. If the target eNodeB is in hybrid mode, the CSG membership state can be used to perform differentiated processing for CSG and non-CSG members. If the target cell is a CSG cell and the CSG membership indication is "nonmember", the target eNodeB allows only emergency bearers.

5a. The target eNodeB allocates the requested resource and returns the corresponding parameter to the target MME in the message handover request acknowledgment (target-to-source transparent container, EPS bearer configuration list, unconfigured EPS bearer). If the number of radio bearers in the source-to-target transparent container does not follow the number of bearers requested by the MME, the target eNodeB should ignore them and allocate the bearer as requested by the MME. When transmitting a handover request acknowledgment message, the target eNodeB should be ready to receive the downlink GTP PDU from the serving GW for the allowed EPS bearer.

The target eNodeB selects the AS integrity and encryption algorithm(s). The target eNodeB inserts the AS integrity and encryption algorithm(s) into the UTRAN RRC message, in addition to the information provided by the MME (eKSI, NAS integrity protection and encryption algorithm(s) and NONCEMME), which is included in the target to source transparent container.

6. When "indirect forwarding" and serving GW relocation are applied, the target MME sends an indirect data forwarding tunnel request message (target eNodeB address, TEID for DL data forwarding) to the Serving GW.

Indirect forwarding may be performed via a serving GW different from the serving GW used as an anchor point for the UE.

6a. The Serving GW returns the generation indirect data forwarding tunnel response (Reason, Serving GW address(es) and Serving GW DL TEID for data forwarding) to the target MME.

7. The target MME sends a message forward relocation response (Reason, RAB Setting List, EPS Bearer Setting List, MME Tunnel Endpoint Identifier for Control Plane, RAN Reason, MME Address for Control Plane, Target to Source Transparent Container, and Data Forwarding and a serving GW change indication) to the source SGSN. The serving GW change indication indicates whether a new serving GW is selected. The target-to-source transparent container contains the value from the target-to-source transparent container received by the target eNodeB.

The "address(es) and TEID(s)" IE for user traffic data forwarding defines a destination tunneling endpoint for data forwarding in the target system and is set as follows. There is "direct forwarding" or "indirect forwarding" but if a relocation of the serving GW is not applied, "Address for Data Forwarding and TEID" of the IE includes the forwarding DL GTP-U tunnel endpoint parameter to eNodeB received in step 5a.

If the "indirect forwarding" and the relocation of the serving GW are applied to the IE, the "address(es) and TEID(s)" for data forwarding include the forwarding service GW received in step 6a or the DL GTP-U tunnel endpoint parameter to the target eNodeB.

8. If "indirect forwarding" is applied, the source SGSN should send a generation indirect data forwarding tunnel request (address(es) and TEID(s) for data forwarding received in step 7) message to the serving GW used for indirect forwarding.

Indirect forwarding may be performed via a serving GW different from the serving GW used as an anchor point for the UE.

8a. The Serving GW returns the forwarding user plane parameters by sending a message generation indirect data forwarding tunnel response (reason, GW address(es) and TEID(s) for data forwarding). If the serving GW does not support data forwarding, an appropriate reason value should be returned and the serving GW address(es) and TEID(s) will not be included in the message.

2. Execution Phase

FIG. 20 illustrates a UTRAN Iu mode to E-UTRAN inter-RAT HO (handover) execution phase according to an embodiment of the present invention.

In the case of the PMIP-based S5/S8, procedure steps (A) and (B) are defined in TS 23.402 [2]. Step (B) shows PCRF interaction for PMIP based S5/S8. Steps 9 and 9a relate to GTP based S5/S8.

The source RNC continuously receives the downlink and uplink user plane PDUs.

1. The source SGSN completes the preparation phase towards the source RNC by sending a message relocation command (target RNC to source RNC transparent container, RABs to be released, RABs that are the subject of a data forwarding list). The "list of RABs to become the release list" IE is a list of all NSAPIs (RAB Ids) in which the bearers are not set in the target eNodeB. The "RABs of the data forwarding list" IE can be included in the message, and if "direct forwarding" is applied, it should be a list of "address and TEID for forwarding user traffic data". If "indirect forwarding" is applicable and the direct tunnel is used, the "RABs of the data forwarding list" IE contains the parameters received in step 8a of the preparation phase. If "indirect forwarding" is applicable and the direct tunnel is not used, then the "RABs that are the subject of the data forwarding list" IE contains the source SGSN address(es) and TEID(s) allocated for indirect data forwarding by the source SGSN. The target RNC to source RNC transparent container contains a value from the target-to-source transparent container received from the target MME.

2. The source RNC will command the UE to handover to the target eNodeB through the message HO from the UTRAN command. The access network specific message for the UE includes a transparent container including wireless aspect parameters which have been set in the preparation phase by the target eNodeB.

The source RNC may initiate data forwarding for the specified RAB/EPS bearer context clearly indicated in "RABs that are the subject of the data forwarding list." The data forwarding may proceed directly to the target eNodeB, or may proceed through the serving GW if determined by the source SGSN and/or the target MME in the preparation phase.

When receiving the HO from the UTRAN command message containing the relocation command message, the UE should associate the RAB ID with its Bearer ID based on its relationship with the NSAPI and suspend the uplink transmission of the user plane data.

4. The UE moves to the E-UTRAN and performs the access procedure to the target eNodeB.

5. When the UE accesses the target eNodeB, the UE sends HO completion to the message E-UTRAN.

The UE implicitly extracts EPS bearers from which the E-RAB is not set from the HO from the UTRAN command and at this stage locally deactivates them without an explicit NAS message.

6. If the UE has successfully accessed the target eNodeB, the target eNodeB informs the target MME by sending a Handover Notification (TAI+ECGI, Local Home Network ID) message.

In the case of SIPTO in a local network with a standalone GW structure, the target eNodeB should include the local home network ID of the target cell in the handover notification message.

7. The target MME then knows that the UE has reached the target side and the target MME informs the source SGSN by sending a Forward Relocation Complete Notification (ISR Activation, Serving GW Change) message. If ISR activation is indicated, this indicates to the source SGSN that it maintains the context of the UE and activates the ISR, which is only possible if the S-GW has not been changed. The source SGSN should also acknowledge the information. The timer of the source SGSN is started for monitoring if the source RNC and the resources of the source serving GW (for serving GW relocation) are released.

When receiving the forward relocation completion acknowledgment message, if the indirect forwarding is applied, the target MME starts the timer.

8. The target MME now completes the inter-RAT handover procedure by notifying the serving GW (which may be the target serving GW) (for target serving GW relocation) that the target MME is now responsible for all bearers configured by the UE. This is performed for each PDN connection, in the message change bearer request (reason, MME tunnel endpoint identifier for control plane, EPS bearer ID, MME address for control plane, allowed EPS bearers, and eNodeB address(es) for user traffic for the RAT type, TEID(s), activated ISR). Because of the mobility from the UTRAN, if the target MME supports location information change reporting, regardless of whether a location information change report has been requested, the target MME should include user location information in the modified bearer request (according to supported granularity). If the PDN GW requests user CSG information (determined from the UE context), the MME also includes a user CSG information IE in this message. If the UE time zone has changed or the forward relocation request message from the source SGSN indicates a pending UE time zone change report (via change by a report flag), then the MME includes a new serving network IE in this message. If indicated, the activated ISR information indicates that the ISR is activated, which is possible only if the S-GW has not been changed. If the modified bearer request does not indicate ISR activation and the S-GW does not change, the S-GW deletes the ISR resource by sending a bearer delete request to another CN node having bearer resources reserved by the S-GW.

The MME releases the unauthorized dedicated bearer by triggering the bearer release procedure. When the Serving GW receives the DL packet for the non-allowed bearer, the Serving GW drops the DL packet and does not send a downlink data notification to the MME.

If the primary bearer of the PDN connection is not allowed by the target eNodeB and another PDN connection is active, then the MME handles this in the same manner as if all bearers of the PDN connection were not allowed. The MME releases this PDN connection by triggering the MME Request PDN disconnection procedure specified in Section 5.10.3.

9. The Serving GW (which is the target Serving GW) (for serving GW relocation) may inform the PDN GW of a change about the RAT type which may be used for billing by sending the message modification bearer request per PDN connection, for example, a change about the serving GW relocation. If existing in step 8, the S-GW also includes a user location information IE and/or a UE time domain IE and/or a user CSG information IE. If they are received in step 4 or step 8 of section 5.5.2.1.2, the serving network should be included. In the case of the serving GW relocation, the serving GW may allocate a DL TEID via S5/S8 for the non-allowed bearer and include a PDN charging suspend support indication. The PDN GW should acknowledge the request using the message modification bearer response. In the case of Serving GW relocation, the PDN GW updates its Context field and returns a modified bearer response ((if the PDN GW is selected to enable the function) billing Id, an MSISDN, a PDN Billing Suspend Enable indication, etc.) to the serving GW. If the PDN GW is stored in the UE context, the MSISDN is included. If a location change report is requested and supported at the target SGSN, the PGW should provide MS Info change reporting action to the modified bearer response.

If the PCC infrastructure is used, the PDN GW informs the PCRF of, for example, a change in the RAT type.

If the Serving GW is relocated, the PDN GW should send one or more "end marker" packets on the previous path immediately after switching the path. The source serving GW should forward the "end marker" packet to the source SGSN or RNC.

10. The Serving GW (which will be the Target Serving GW) (for serving GW relocation) acknowledges the user plane switch to the target MME through the bearer response modification message (Reason, GW Tunnel Endpoint Identifier for Control Plane, Serving GW Address for Control Plane, protocol configuration options, MS info change report action). At this stage, the user plane path is established for all bearers between the UE, the target eNodeB, and the serving GW (which will be the target serving GW) (for serving GW relocation).

If the serving GW is not changed, the serving GW should send one or more "end marker" packets over the previous path immediately after switching the path to assist the relocation function on the target eNodeB.

11. The UE initiates the Tracking Area Update procedure if one of the conditions listed in the section "Triggers for Tracking Area Update" applies.

Since the target MME has received bearer context(s) by the handover messages, the target MME knows that the IRAT handover has been performed for the UE, and thus the target MME performs only the subset of the TA update procedure and particularly excludes the context delivery procedure between the source SGSN and the target MME.

12. When the timer started in step 7 expires, the source SGSN will remove all resources towards the source RNC by sending an Iu release command to the RNC. If the RNC no longer needs to transmit data, the source RNC responds with an Iu Release Complete message.

When the timer started in step 7 expires and the source SGSN receives the serving GW change indication in the forward relocation response message, the delete session request (reason, operation indication) message is sent to the source serving GW to thereby delete the EPS bearer resources. An operation indication flag indicating that the source serving GW should not start the deletion procedure for the PDN GW is not set. The source serving GW acknowledges using session response (reason) message deletions. If the ISR is activated prior to this procedure, the source S-GW instructs the source S-GW to send a delete bearer request message to the corresponding CN node, thereby indicating the reason why the bearer resources of the other previous CN node should be deleted.

13. If Indirect forwarding is used, the expiration of the timer at the source SGSN initiated in step 7 triggers the source SGSN to send a Delete Indirect Data Forwarding Tunnel Request Delete message to the S-GW in order to release the temporary resource used for indirect forwarding.

14. If indirect forwarding is used and the serving GW is relocated, expiration of the timer at the target MME initiated at step 7 triggers the target MME to send a delete indirect data forwarding tunnel request to the target S-GW in order to release the temporary resources used for indirect forwarding.

5G System Evolution Technology

The 5G architecture defined so far is as follows.

Key architectural principles:

Separate UP and CP functions to enable independent scalability and evolution.

Allows flexible placement of the UP, i.e., central position or distributed (remote) position (i.e., no position limitation) separate from the CP function.

Modularizes the functional design to thereby, for example, enable flexible and efficient network slicing.

Supports an integrated authentication framework for UEs which can support only a subset of NGS functions (e.g., do not support mobility).

Separate access and mobility management (AMF) and session management (SMF) which enables independent evolution and scalability. Supports UEs concurrently connected to multiple network slices. Other control plane functions may be separated (e.g., by PCF). The way to map the network slicing KI #1 results to the architecture can be determined at the normative step.

Supports flexible information models with network functions and subscriptions and policies separate from the nodes.

Minimizes access and core network dependencies by specifying an integrated access-agnostic core that integrates different 3GPP and non-3GPP access types as a common AN-CN interface.

To support "stateless" NFs (which are separated from "storage" resources where the "operation" resource stores state as opaque data), 3GPP can specify an interface between the NF and the data storage function (possibly by reference). NFs can store opaque data using the data storage function.

Key Architectural Requirements:

The architecture should support capability exposure.

Each network function can directly interact with other NFs. The architecture should not exclude the use of intermediary functions to assist routing of control plane messages (e.g., similar to DRA).

Supports transmission of other PDU types, such as IP and Ethernet.

Supports separate policy function to manage network operation and end user environment.

Allow different network configurations with different network slices.

This architecture supports roaming by using home routing traffic as well as local breakout traffic in an efficient manner in visited PLMNs.

Control Plane:

enables multi-vendor interworking between access network and network functions in the core network and network functions in the core network. At the same time, a single interface is exposed to the radio, but it is sufficient to abstract the modular (basic) functions supported within the core network.

Procedures (that is, a set of interactions between two NFs) can be defined as services, be reusable and support modularity whenever applicable. If a procedure is specified, this will be evaluated on a case-by-case basis.

User Plane:

a general user plane function (UPF) that supports various user plane operations (including forwarding other UP functions/data networks/control-plane operations, bit rate execution operations, service detection operations, etc.) is defined.

The detailed list of user plane operations is part of the conclusion to the main issue 4 of Section 8.4.

The control plane constitutes the UP function which provides the traffic processing function required for the session. One or multiple UP functions per session may be activated and configured by the control plane as needed for a given user-plane scenario.

In order to support low latency services and access to the local data network, user plane functionality can be deployed close to the wireless. In the case of a central data network, the UPF can be deployed centrally.

In order to support home routing roaming, at least the UP function is located in the HPLMN and the VPLMN needs to have at least one other UP function including roaming functions such as billing, LI, and so on.

Concurrent access to local and centralized services is supported as follows:

A multi-PDU session including a local UP function (providing access to local data networks) and a PDU session providing access to a (central UP function) PDU session providing access to a central data network;

A single PDU session where the controller can configure multiple UP functions.

In the case of a single PDU session for local data network access, the control plane can also configure several UP functions.

Agreements for the entire architecture are as follows:

1. AMF and SMF functions in Rel-15 should be standardized as separate functions through standardized interactions.

2. NAS MM and SM protocol messages are terminated in AMF and SMF, respectively. It has nothing to do with whether SM protocol is terminated in H-SMF or V-SM F.

3. NAS SM messages are routed by AMF.

4. NextGen's subscription profile data is managed according to the user data convergence approach:

A common user data repository (UDR) stores subscription data, which may reside in the UDM.

Implement the application front-end to access relevant subscription data so that the UDM front-end and the PCF can access these public UDRs.

The application logic of the PCF, as well as the application logic of the UDM front-end, e.g., for location management and subscription update notification, will be described in detail during the normative steps.

5. SEAF and SCMF are supported by AMF.

6. AUSF is defined as a separate NF.

The conclusions of bullets 4 and 5 may need to be reviewed according to the SEAF/SCMF location in relation to ongoing studies in SA WG3, e.g., slicing aspects.

7. Each NF can interact directly with each other.

8. This architecture does not account for intermediate functionality between control plane functions, but does not exclude the use of intermediate functionality for routing and forwarding messages (e.g., DRA) between control plane functions, which may be identified in the form of deployments, and no further work in step 2 should be required.

Interworking Procedure Between EPC and 5GC

FIG. 21 illustrates an interworking architecture between an EPC and a 5GC (or NGC (Next-generation core)) that can be applied to the present invention.

Referring to 21, when the UE supports both EPC and NGC, even if the UE camps in the EPC through the first E-UTRAN, the P-GW, which is the IP anchor point, can be selected as a P-GW capable of interworking with the UPF of 5GC (or NGC), so that the same IP anchoring can be maintained even when the UE moves between the system/RAN. In addition, a NGx (Nx) interface is defined between the MME and the AMF to allow interworking between the EPC and the 5GC (or NGC) without interruption. The NGx (Nx) interface defined between the MME and the AMF can be referred to as an "N26 interface".

FIG. 22 is a diagram illustrating the deployment of a 5G RAN that may be connected to a NG core. In particular, FIG. 22 illustrates co-sited state with E-UTRA.

The NR function may be co-sited (co-located) with a part of the same base station or with multiple base stations at the same location together with the E-UTRA function.

Co-location can be applied to all NR deployment scenarios (e.g., city macro). In this scenario, it may be desirable to fully utilize all spectrum resources allocated to two RATs, through load balancing over multiple RATs or through a connection (for example, using lower frequencies as a coverage layer for users on cell boundaries).

If there is an NGx interface (i.e., N26) between the EPC and the 5GC, the UE can perform the TAU while transiting from EPC to 5GC or from 5GC to EPC. In this case, the UE context in the previous/old core network can be directly transferred to the new core network via the NGx (or N26) interface, so that a faster core network change can be performed.

For example, a UE transiting from EPC to 5GC may transmit TAU (e.g., TAU request message) through 5G RAT after changing RAT to 5G RAT, and AMF receiving the TAU may obtain the MME address of the EPC based on the TAU information (for example, the TAU related information included in the TAU request message). In this case, the AMF can directly receive the UE context through the NGx (or N26) interface from the MME corresponding to the acquired address, and can service the UE. Similarly, a UE transiting from 5GC to EPC may transmit a TAU (e.g., a TAU request message) after changing the RAT to LTE RAT, and the MME receiving the TAU may obtain the address of the AMF based on the TAU information (e.g., the TAU-related information included in the TAU request message). In this case, the MME can directly receive the UE context from the AMF corresponding to the acquired address through the NGx (or N26) interface, and serve the UE.

However, if there is no NGx (or N26) interface, the UE cannot receive the UE context from the previous network in the network even if the UE performs the TAU, so that the TAU rejection (e.g., TAU rejection message transmission) is performed. In this case, the UE should perform handover attach (or may be referred to as handover registration, i.e., connection can be substituted with registration) for core network change/movement separately. As a result, it takes a long time for the UE to change the core network and the service interruption time is also increased.

As a solution to this problem, it is possible to define/set the UE to always perform the handover attach/registration when the core network is changed (without performing the TAU), but latency may increase because attach/registration should be performed. Also, in the case of attach/registration, more signaling occurs than TAU.

Therefore, the following proposes a solution for appropriately determining whether the UE performs the TAU procedure or the handover attach/registration for the core network change. In particular, the following proposes a solution at the core network perspective/level and a solution at the RAN perspective/level.

[Core Network Level Solution]

When the UE is connected to the EPC network, the AMF assigns a Temp ID to the UE when the MME is connected to the NGC network, similarly to the case where the MME allocates a GUTI to the UE. As described above, the GUTI includes an MME id that allocates the corresponding GUTI to the UE. The temporary (Temp) ID allocated by the AMF also includes the AMF id that allocated the corresponding temporary (Temp) ID. Therefore, if the UE transmits a GUTI/Temp ID together while performing a TAU on a new core network (e.g., by including the GUTI/Temp ID in the TAU request message), the new core network can find out the address of the previously served MME/AMF, based on the MME/AMF id included in the GUTI/Temp ID transmitted from the UE. Also, similarly to the case where the MME allocates a TA list including a plurality of TAs to the UE and performs TAU when the UE leaves the TA included in the TA list allocated to the UE, the AMF allocates the TA list to the UE, and when the UE leaves the TA, the UE can perform TAU.

FIGS. 23 and 24 illustrate the arrangement of a 5G network to which the present invention may be applied.

The 5G network is expected to be initially deployed in a hotspot format that overlaps with the EPC network. Namely, as illustrated in FIG. 23, a 5G service is provided in a specific area (for example, an area denoted by AMF in FIG. 23), and the other areas (for example, areas indicated by MME 1 and 2 in FIG. 23) are expected to provide EPC services.

In FIG. 23, when there is an NGx interface (for example, N26) between the AMF and the MME 1/MME 2, the AMF may send an indication to explicitly or implicitly instruct the UE to allocate the TA list to the UE and perform the TAU when there is a change in the core network. At this time, the indication may be transmitted together with the TA list or independently/separately, and may be implemented in various forms according to the embodiment. For example, the indication may be in the signaling form of an indicator (explicit indicator) instructing the UE to perform the TAU when there is a change in the core network or an indicator (implicit indicator) indicating that there is NGx interface (e.g., N26).

When the UE receives the service from the 5G core network and then leaves the 5G service area, the UE can change the core network to the EPC by performing the TAU, and the service can be continuously received by the EPC after the change. At this time, the MME 1 or the MME 2 can receive the TAU from the UE according to the location where the UE actually moved. The MME receiving the TAU may receive the UE context from the AMF via the NGx interface (for example, N26), and it is possible to continuously provide the service that is being provided to the UE.

The above example assumes that there is an NGx interface (e.g., N26) between the AMF and the surrounding MMEs (MME 1 and MME 2). However, in practice, there may not be an NGx interface (e.g., N26) between the AMF and at least some of the MMEs in the vicinity. For example, AMF may have no NGx (e.g., N26) interface with MME 1, while there may be NGx (e.g., N26) interface between the AMF and MME 2. FIG. 24 illustrates such a scenario.

Referring to FIG. 24, in this case, the AMF should allocate a TA list in consideration of the presence or absence of an NGx (for example, N26) interface with the neighboring MMEs (MME 1 and MME 2 in this figure). For example, when the UE is located in the TA 7 area, the AMF may send, to the UE, an indication (or an indication indicating that the N26 interface is not present) instructing the UE to allocate a TA list for the UE to {TA1, TA6, TA7}, and perform handover attach/registration when the UE moves out of the TA to the EPC (since it is expected to move to the MME1 without the NGx (e.g., N26) interface). On the other hand, if the UE is located in the TA 3 area, the AMF may allocate the TA list for the UE to {TA1, TA3, TA4}, and send, to the UE, an indication (or an indication that an N26 interface is present) instructing the UE to perform the TAU when the UE transitions from TA to EPC (since it is expected to move to the MME2 with an NGx (e.g., N26) interface).

If the UE is located in an area where it is expected to move to both MME1 and MME2 like TA2 and TA5, since the network is ambiguous to which position the terminal will move, the AMF may send, to the UE, an indication instructing the UE to allocate the TA list and perform the handover attach/registration.

Although the above embodiment has been described mainly on the case where the core network is changed from 5GC to EPC, the same can be applied when the core network is changed from 5GC to 5GC in the EPC, and in this case, the TA list allocation and/or the subject of indication transmission may be substituted by the MME.

The UE determines whether to perform TAU or handover attach/registration when an inter-system change occurs according to an indication sent by the AMF or MME when allocating the TA list. Such an indication may be sent with the TA list, or independently/separately, depending on the embodiment.

FIG. 25 is a flowchart illustrating an interworking procedure when a UE moves from EPC to 5GC according to an embodiment of the present invention. The present embodiment assumes that there is no NGx (e.g., N26) interface between the MME and the AMF.

1. The MME may send, to the UE, an indication instructing the UE to perform the handover attach/registration when moving from EPC to 5G core in the TAU procedure (e.g., the indication may be included in the TAU approval message). At this time, the transmitted indication may correspond to an indication to explicitly or implicitly instruct the UE to perform handover attach/registration when the core network is changed. For example, the indication may correspond to an indication instructing the UE to perform the handover attach/registration when the network is changed (i.e., explicit indication) or an indication that there is no NGx (e.g., N26) (i.e., implicit indication). These indications may be delivered within the access/registration procedure according to the embodiment in addition to the TAU procedure.

2. Depending on the mobility of the UE, the UE can move from the area serviced by EPC to the area serviced by 5GC.

3. The UE may transmit an attach/registration request for handover attach/registration at 5GC to the 5GC network (in particular, the AMF) according to the indication received in the first step. Here, the access/registration request for the handover attach/registration may refer to a access/registration request including the handover indication (or the access/registration type is set to the handover). Thus, the access/registration procedure of the handover type can be performed. At this time, the UE can further inform the 5GC that it has moved from the EPC.

If the UE moves to the 5GC service area belonging to PLMN (which may be another PLMN including the E (Equivalent)-PLMN) which is different from the EPC to which the UE belongs, the UE can perform the access/registration procedure in the 5GC regardless of the indication received from the MME. The access/registration procedure at this time means an initial access/registration procedure, not a handover type access/registration procedure. If the 5GC of another PLMN is selected, the operation of the UE may depend on the implementation of the UE, or the MME may instruct specific operations in the first step. For example, the MME can provide the UE with information to perform handover attach/registration only when moving/selecting to the 5GC of the same PLMN (including all up to EPLMN), and the UE can operate accordingly.

4. The UE may perform an authentication procedure with the network for access/registration.

5. The network node (e.g., AMF) may send an access/registration acknowledgment to the UE if authentication is successfully completed. In this process, the network may transmit an indication about the operation which should be performed by the UE when there is a change in the core network (whether to perform the TAU or handover attach/registration). Such an indication may be signaled explicitly in the form of an explicit indication instructing TAU/handover attach/registration, or may be signaled in an implicit indication format indicating whether there is an NGx (e.g., N26) interface, as described above.

6. The UE can transmit the PDU session request message to the network while setting the request type to the handover, and can set the previous access information to the 3GPP/EPS (or more specifically E-UTRAN) to thereby be transmitted together. In general, access information is used to distinguish whether the UE has been provided the service through the non-3GPP before the handover or whether it has been in the EPC through the 3GPP (E-UTRAN) before the handover. The UE notifies the AMF that the handover attach/registration is performed by including a handover indication in the MM message encapsulating the PDU session request as well as the PDU session request.

7. When the AMF receives the handover indication included in the MM message, the AMF receives the UE context of the UE from the UDM and finds the SMF that has previously served the UE.

8. The AMF can forward the PDU session request to the SMF serving the UE. When the SMF recognizes the handover indication included in the PDU session request, the SMF can allocate the same UPF and IP address to the UE requesting the PDU session based on the UE context that was previously served.

9. SMF can send a PDU session response to the UE via AMF to thereby allocate the previously used IP address to the UE.

In this procedure, the PDU session request message in step 6 may be included in the access/registration request itself so as then to be transmitted as in EPS. In this case, the UE may include the handover indication in the access/registration request message which is an mobility management (MM) message so as then to be transmitted so that the AMF may recognized that the corresponding access/registration request is an access/registration request of a handover type. In this case, the procedure is performed in the order of steps 4, 7 and 8 after step 3, and the step 9 may be included in the access/registration approval message after all the procedures are completed so as then to be transmitted to the UE.

FIG. 26 is a flowchart illustrating an interworking procedure when the UE moves from EPC to 5GC according to an embodiment of the present invention. The present embodiment assumes that an NGx (e.g., N26) interface exists between the MME and the AMF.

1. The MME may forward, to the UE, an indication instructing the UE to perform the TAU when the UE moves from EPC to 5GC in the TAU procedure (e.g., by including the indication in the TAU approval message). At this time, the transmitted indication may correspond to an indication to explicitly or implicitly instruct the UE to perform the TAU when the core network is changed. For example, the indication may correspond to an indication (i.e., an implicit indication) instructing the UE to perform the TAU when the network is changed or an indication indicating that an NGx (e.g., N26) interface exists. These indications may be delivered in the access/registration procedure according to the embodiment in addition to the TAU procedure.

This step can be interpreted in conjunction with the embodiment of FIG. 25. For example, when an indication to perform handover attach/registration is defined as in the embodiment of FIG. 25, the expression "indication to perform TAU has been received" in the present embodiment may be understood as "indication to perform handover attach/registration has not been received". Therefore, even if the UE has not received an indication to perform the handover attach/registration from the MME, the UE can perform steps 2 to 8 described below.

2. Depending on the mobility of the UE, it can be moved from the area serviced by 5GC to the area serviced by EPC.

3. The UE may transmit the TAU request to the network node (e.g., the AMF) according to the indication received in step 1.

If the UE moves to the 5GC service area belonging to PLMN (which may be another PLMN including the E (Equivalent)-PLMN) which is different from the EPC to which the UE belongs, the UE can perform the access/registration procedure in the 5GC regardless of the indication received from the MME. The access/registration procedure at this time means an initial access/registration procedure, not a handover type access/registration procedure. If the 5GC of another PLMN is selected, the operation of the UE may depend on the implementation of the UE, or the MME may instruct specific operations in the first step. For example, the MME can provide the UE with information to perform handover attach/registration only when moving/selecting to the 5GC of the same PLMN (including all up to EPLMN), and the UE can operate accordingly.

4. Based on the GUTI information included in the TAU request transmitted by the UE, the AMF can find the MME address that has previously managed the UE, and request the UE context to the MME corresponding to the address.

5. The MME may send the UE context to the AMF.

6-7. The AMF finds the address of the serving SMF based on the UE context received from the MME (understood by the P-GW address), and informs the serving SMF that the UE is serviced by the 5GC.

8. The AMF can send a TAU approval to the UE. In this process, the network (for example, AMF) may transmit an indication indicating the UE which operation should be performed when the core network is changed. In this process, the network may transmit an indication indicating the UE which operation should be performed when the core network is changed (whether to perform the TAU or handover attach/registration). This indication may be signaled explicitly in the form of an explicit indication indicating the UE to perform TAU/handover attach/registration, or may be signaled in an implicit indication format indicating whether an NGx (e.g., N26) interface exists, as described above.

Although the above-described flowcharts in FIGS. 25 and 26 are described with reference to the case where the UE moves from EPC to 5GC, the present invention is not limited thereto, and the same can be applied to the case where the UE moves from 5GC to EPC. Therefore, in the above embodiment, 5GC can be replaced with EPC, EPC with 5GC, AMF with MME, and MME with AMF.

In the above-described embodiments, the UE may be set to perform TAU by default, and the network (e.g., AMF/MME) may be set to transmit a handover attach/registration indication to the UE only when a handover attach is required/possible. For example, if the UE does not receive a separate indication (e.g., a handover attach/registration indication), it can perform the TAU procedure. If the UE receives a separate indication, it can perform a handover attach/registration procedure. Here, the indication to perform handover attach/registration may correspond to an indication that the UE should include an IMSI in the access/registration request.

In contrast, the UE is basically set to perform a handover attach, and the network can be set to transmit a TAU performance indication to the UE only when the TAU is necessary. For example, the UE can perform the handover attach/registration procedure when it does not receive a separate indication (e.g., a TAU indication), and can perform the TAU procedure when receiving a separate indication.

[RAN Level Solution]

When the UE receives the EPC service through the eNB and then transits to the 5G core through the gNB, whether the UE performs the TAU or the handover attach/registration is determined depending on whether the UE is in the connected mode or the idle mode as follows.

1) When the UE is in the Connected Mode i) When an NGx (e.g., N26) Interface Exists Between the EPC and the 5GC (HO (Hanodver) Operation)

The eNB recognizes that handover is possible because NGx (for example, N26) interface exists, and can transmit a handover required message to the MME and inform the MME of the address of the target gNB.

In this case, similarly to the conventional handover procedure, all the UE contexts are transferred from the EPC to the 5GC through the NGx (for example, N26) interface, and after the handover is completed, the UE may perform the TAU procedure in order to receive the allocated TA list.

ii) When there is No NGx (e.g., N26) Interface Between the EPC and the 5G Core (Idle Mode Cell Reselection Operation)

The eNB recognizes that the NGx (for example, N26) interface does not exist, releases the RRC, and instructs the UE to give the cell information of the target gNB and camp on the cell. At this time, the eNB may transmit an indication instructing that handover attach/registration is necessary, or a cause value to the UE.

The UE camps in the cell of the target gNB according to the radio/frequency information received from the eNB through the RRC release, and then performs the handover attach/registration procedure according to the handover attach/registration indication transmitted by the eNB.

2) When the UE is in Idle Mode

The UE can perform handover attach/registration or TAU based on the received indication as the RRC is released from the previous connection mode.

In the above-described embodiment, the description has been centered on the case where the UE receives the service from the EPC and then moves to the 5GC. However, the present invention is not limited thereto and the same applies to the case where the UE moves from the 5GC to the EPC. Therefore, in the above embodiment, 5GC can be replaced with EPC, EPC with 5GC, AMF with MME, and MME with AMF.

In the above-described RAN level solution, the eNB/gNB can determine whether handover attach/registration is possible depending on whether the NGx (for example, N26) interface exists through the method described below by referring to FIGS. 27 to 29.

FIGS. 27 to 29 are flowcharts illustrating an eNB/gNB operation procedure for determining whether a handover attach/registration is possible depending on whether an NGx (for example, N26) interface according to an embodiment of the present invention exists.

Referring to FIG. 27, the eNB/gNB may transmit a handover required message to the MME/AMF. At this time, if there is no formed/established NGx (for example, N26) interface, the MME/AMF can transmit a handover preparation failure message to the eNB/gNB, and can set the cause value as a value indicating that the handover is impossible because the NGx (for example, N26) does not exist so as to transmit the cause value together. In this case, the cause value may be set to various reason values indicating that handover is impossible, such as "no NGx interface" or "inter system handover not supported". The eNB/gNB receiving the cause value can recognize that the handover is impossible and notify the UE of the necessity of handover attach/registration through RRC release as in the above-mentioned solution (for example, by sending the indication to perform the handover attach/registration).

And/or, when setting the initial configuration with the MME/AMV, the eNB/gNB may be configured/instructed from the MME/AMF indicating that there is no NGx (e.g., N26) interface through S1 setup/N2 setup as illustrated in FIG. 28. Alternatively, the eNB/gNB may be configured/instructed from the MME/AMF about the configuration that the inter system handover is impossible. The eNB/gNB can determine whether handover attach/registration is possible based on the configuration information, and perform the RAN level solution operation described above. This configuration information can be set by the MME/AMF differently/independently for each PLMN. In other words, in the case of network slicing, the handover attach/registration availability can be set differently and independently for each PLMN since some providers may support handover and other providers may not support according to their policy.

Further, such configuration information can be updated through the MME configuration update illustrated in FIG. 29.

If information on whether the handover is possible is changed (e.g., the NGx (e.g., N26) interface support through the operator policy or update), the MME/AMF informs the eNB/gNB of the change, to thereby update configuration information on whether the handover is possible/whether NGx (e.g., N26) interface exists.

In the above embodiments, the UE is set to perform TAU by default, and the network (for example, eNB/gNB) may be set to transmit the handover attach/registration indication to the UE only if the handover attach is necessary/possible. For example, if the UE does not receive a separate indication (e.g., a handover attach/registration indication), the UE can perform the TAU procedure. If the UE receives a separate indication, the UE can perform a handover attach/registration procedure. Here, the indication to perform handover attach/registration may correspond to an indication that the UE should include an IMSI in the access/registration request.

The following embodiments can be applied to both the RAN level solution and the core network level solution.

When performing handover attach/registration, the UE should set the request type to handover in the PDN connectivity request/PDU session request message and transmit the request type. However, according to the conventional art, since the handover attach/registration is used only between the non-3GPP access and the 3GPP access, if the request type is set to the same handover and is transmitted, the network cannot determine whether a PDU session is transmitted from the non-3GPP, or the PDU session is transmitted from the 3GPP (however, another network core).

In order to solve such an ambiguity, a new request type for interworking proposed in the present specification can be defined and used without directly using a previously defined request type.

For example, according to TS 24.008, request type information elements are defined as shown in Table 2.

TABLE 2

Request type value (octet 1)
Bits

| 3 | 2 | 1 | | |
|---|---|---|---|---|
| 0 | 0 | 1 | | initial request |
| 0 | 1 | 0 | | Handover (NOTE 1) |
| 0 | 1 | 1 | | Unused. If received, the network shall interpret this as "initial request." |
| 1 | 0 | 0 | | emergency |
| 1 | 1 | 0 | | handover of emergency bearer services (NOTE 1) (NOTE 2) |

All other values are reserved.

Bit 4 of octet 1 is spare and shall be coded as zero.

The request type value set to "010" in Table 2 means that the PDN connection is transmitted to the 3GPP (or non-3GPP) access in the non-3GPP (or 3GPP) access. This transmission is not a handover controlled by the 3GPP connection mode mobility procedure specified in 3GPP TS 25.331 [23c] and 3GPP TS 36.331 [129]. The "handover of emergency bearer services" is handled as a "reserved bit" in the A/Gb-mode and Iu-mode.

Referring to Table 2, one unused value remains ("011"), and it can be set/defined as a request type indicating handover between 3GPP accesses as shown in Table 3 and used. At this time, the handover between 3GPP accesses means handover from 5G network.

TABLE 3

Request type value (octet 1)
Bits

| 3 | 2 | 1 | | |
|---|---|---|---|---|
| 0 | 0 | 1 | | initial request |
| 0 | 1 | 0 | | Handover (NOTE 1) |
| 0 | 1 | 1 | | Handover (between 3GPP accesses) |
| 1 | 0 | 0 | | emergency |
| 1 | 1 | 0 | | handover of emergency bearer services (NOTE 1) (NOTE 2) |

If a distinction needs to be made between 3GPP access and non-3GPP access in the 5G network, additional request types can be newly defined and used. For example, "011" may mean handover from 5G 3GPP to EPC and "101" may mean handover from 5G non-3GPP to EPC.

Alternatively, there is a method of reusing the conventional handover request type, and defining a separate IE in which a PDU session is transmitted/delivered from a PDU session to a PDN connectivity request/PDU session request message.

In a 5G network, multiple PDU sessions can be created with the same DNN (Data Network Name). Thus, the network cannot determine exactly which PDU session is to be transmitted/received, simply by knowing from which access the PDU session is transmitted/delivered. For example, in the 5G network, two or more PDU sessions can be created with the same DNN via E-URAN, in which case the MME should know exactly which PDU session to transfer/forward to the eNB to determine which SMF/P-GW is to be selected. Accordingly, the UE can include the PDU session ID for identifying the PDU to be transmitted/delivered, in the PDN connectivity request/PDU session request message, to thereby be sent. At this time, the UE can include the PDU session ID in the newly defined IE in the PDN connectivity request/PDU session request message, so as to be transmitted. Apart from sending the PDU session ID, the request type can be sent through the method proposed above.

If the PDU session ID is included in the PDN connectivity request transmitted from the UE, the MME selects the SMF/P-GW address matching the PDU session ID based on the information received from the UDM+HSS, to thereby process the PDN connectivity request of the UE.

Hereinafter, a solution of the following issue related to the case that the N26 interface does not exist in the connection mode of the UE is proposed.

An additional optimization scheme that allows the UE to skip the TAU request/rejection when the UE in the connected mode moves from 5G to EPC To minimize service interruption time while inter-system mobility is generated in connection mode, the UE does not support dual registration and the network supports only the interworking without the N26 interface.

Therefore, we propose to support RAN indication in order to skip unnecessary TAU failures for UE mobility from 5GC to EPC in the connection mode. Two options are proposed below.

Option 1: Failure of Handover Preparation During Handover Preparation

FIG. 30 is a diagram illustrating a failed handover preparation operation according to an embodiment of the present invention.

Referring to FIG. 30, the source NG-RAN can perform an inter-system handover (inter-RAT handover) by transmitting a handover request message to the AMF. In this case, the AMF can respond by sending a handover preparation failure message indicating "inter-system handover is not supported" to the NG-RAN. Therefore, the source NG-RAN can perform the RRC release procedure while instructing to skip an unnecessary TAU. If the UE receives an RRC release message from the E-UTRAN indicating "unnecessary TAU", the UE performs an access procedure (i.e., a handover attach/registration procedure) with an indication of handover.

Option 2: AMF Notifies "Inter-System Handover not Supported" During N2 Setup Procedure.

The NG-RAN knows the inter-system handover capability during the N2 setup procedure. When the NG-RAN detects UE mobility for the E-UTRAN, the NG-RAN can perform RRC release with an appropriate cause "unnecessary TAU". Accordingly, the UE can perform the connection procedure using the PDN connectivity request message indicating "handover" to the EPC.

If the above-described options 1 and 2 are applied to the mobility section for 5.17.2.3.2 single-registration mode UE of TS 23.501, the result may be as follows.

5.17.2.3.2 Mobility for UEs in Single-Registration Mode

If the UE supports the single-registration mode and the network supports interworking procedures without an N26 interface:

In case of movement from 5GC to EPC, the UE performs TAU procedure with 4G-GUTI mapped from 5G-GUTI. The MME determines that the old node is an AMF and rejects the TAU with the indication to "support handover PDN connection setup" to the UE. Based on this indication, the UE may perform the connection at the EPC with a "handover" indication in the PDN Connectivity Request message (TS 23.401 [26], section 5.3.2.1), then the UE moves all other PDU sessions of the UE using the UE initiated PDN connection establishment procedure (TS 23.401 [26] section 5.10.2). The first PDN connection may be established during the E-UTRAN initial access procedure (see TS 23.401 [26]).

In case of movement from EPC to 5GC, the UE may perform a "mobility registration update" type registration at 5GC with a 5G-GUTI mapped from 4G-GUTI. The AMF determines that the old node is an MME, but proceeds as if the registration were of the "initial registration" type. The registration approval includes a "support handover PDU session setup" indication for the UE. Based on this indication, the UE can continuously move all PDN connections from the EPC using the UE initiated PDU session establishment procedure having the "existing PDU sessions" flag (TS 23.502 [3], Section 4.3.2.2.1).

In order to minimize service interruption while the UE is moving from 5GC to EPC in connection mode, the NG-RAN may provide assistance information to skip the TAU procedure. If the UE AS receives the support information for the TAU procedure skip, the UE NAS does not perform the TAU procedure, but instead should perform the access procedure in the EPC with the "handover" indication in the PDC connection request message (TS 23.401 [26], section 5.3.2.1). The UE then moves all other PDU sessions of the UE using the UE initiated PDN connection establishment procedure having the "handover" flag (TS 23.401, section [5.6.2]).

In addition, a method for determining/instructing support information for skipping the TAU procedure in the RRC release message may be further defined.

FIG. 31 is a flowchart illustrating a method of interworking between UEs in a network according to an embodiment of the present invention. The above-described embodiments can be applied to the flowchart in the same manner, and the redundant description will be omitted here.

The step of performing the first interworking procedure for changing the UE's network from the 5GC network to the EPC network may be implemented in two embodiments as follows depending on whether an interface exists between the 5GC and the EPC networks.

If there is no interface between the 5GC and the EPC networks (e.g., N26):

The UE may receive a first indication from the AMF of the 5GC network (S3110). In this case, the first indication received by the UE may correspond to an explicit indication indicating the UE to perform a handover attach or an implicit indication indicating that N26 does not exist.

Next, the UE can perform a handover attach procedure in the EPC network based on the first indication (S3120). To this end, the UE can transmit a handover attach request message to the MME of the EPC network. In this case, the UE may transmit a PDN connectivity request message with the request type set to "handover", to the MME of the EPC.

If there is an interface (e.g., N26) between the 5GC and the EPC networks:

The UE may not receive the first indication from the AMF, and in this case it may perform the TAU procedure in the EPC network.

All PDU sessions created for the UE in the 5GC may be transferred to the EPC network through the handover attach procedure or the TAU procedure. In particular, through the TAU procedure, the MME can receive the PDU session of the UE directly from the AMF through the interface with the AMF.

Also, although not shown in the flowchart, the UE may transmit the previous access information indicating that the UE moves from the 5GC, to the MME while moving to the EPC.

In addition, the EPC to which the UE moves may have an EPC-GUTI that is mapped from a 5GC GUTI.

If there is no interface between the 5GC and the EPC networks and the UE is in the 5GC connection mode, the UE may perform RRC release with the NGC RAN (or gNB) of 5GC and camp in the cell connected with the EPC.

In addition, after the UE changes the network to the EPC, the UE can perform a second interworking procedure for changing the network from the EPC network to the 5GC network. At this time, if there is no interface between the 5GC and the EPC networks, a second indication may be received from the MME of the EPC network. The second indication at this time may also correspond to an explicit indication to perform a handover connection or an implicit indication to indicate that N26 does not exist. Next, the UE can perform the registration procedure in the 5GC network based on the indication. The registration procedure at this time may correspond to a registration procedure in which the registration type is set to mobility registration update. All PDU sessions created for the UE in the EPC may be forwarded to the 5GC network through the registration procedure.

The UE may transmit the previous access information indicating movement from the EPC, to the AMF. The 5GC may have a 5GC-GUTI that is mapped from the GUTI of the EPC.

If there is no interface between the 5GC and the EPC networks and the UE is in the connection mode in the EPC, E-UTRAN (for example, eNBN) and RRC release of the EPC can be performed.

Apparatus to which the Present Invention May be Applied

FIG. 32 illustrates a block diagram of a communication apparatus according to an embodiment of the present invention.

Referring to FIG. 32, a wireless communication system includes a network node 3210 and a plurality of UEs (UE) 3220.

The network node 3210 includes a processor 3211, a memory 3212, and a communication module 3213. The processor 3211 implements the previously proposed functions, processes and/or methods. The layers of the wired/wireless interface protocol may be implemented by the processor 3211. The memory 3212 is connected to the processor 3211 and stores various information for driving the processor 3211. The communication module 3213 is connected to the processor 3211 to transmit and/or receive a wired/wireless signal. Some examples of the network node 3210 may include a base station, an MME, an HSS, an SGW, a PGW, and an application server. In particular, when the network node 3210 is a base station, the communication module 3213 may include a radio frequency unit for transmitting/receiving a radio signal.

The UE 3220 includes a processor 3221, a memory 3222 and a communication module (or RF section). Processor 3221 implements the previously proposed functions, processes and/or methods. The layers of the wireless interface protocol may be implemented by the processor 3221. The memory 3222 is connected to the processor 3221 and stores various information for driving the processor 3221. The communication module 3223 is coupled to processor 3221 to transmit and/or receive wireless signals.

The memories 3212 and 3222 may be located inside or outside the processors 3211 and 3221 and may be coupled to the processors 3211 and 3221 by various well known means. Also, the network node 3210 (in the case of a base station) and/or the UE 3220 may have a single antenna or multiple antennas.

FIG. 33 shows a block diagram of a communication apparatus according to an embodiment of the present invention.

Specifically, FIG. 33 is a more detailed diagram of the UE of FIG. 32.

Referring to FIG. 33, the UE may include a processor (or digital signal processor (DSP)) 3310, an RF module (or RF unit) 3335, a power management module 3305, an antenna 3340, a battery 3355, a display 3315, a keypad 3320, memory 3330, a subscriber identification module (SIM) card 3325 (this element is optional), a speaker 3345 and a microphone 3350. The UE may also include a single antenna or multiple antennas.

The processor 3310 implements the functions, processes and/or methods proposed above. The layers of a radio interface protocol may be implemented by the processor 3310.

The memory 3330 is connected to the processor 3310 and stores information related to the operation of the processor 3310. The memory 3330 may be located inside or outside the processor 3310 and may be connected to the processor 3310 by well-known various means.

A user inputs command information, such as a telephone number, by pressing (or touching) a button of the keypad 3320 or by voice activation using the microphone 3350, for example. The processor 3310 processes a proper function, such as receiving such command information or making a call to a telephone number, so that the function is performed. Operational data may be extracted from the SIM card 3325 or the memory 3330. Furthermore, the processor 3310 may display command information or driving information on the display 3315 so that a user can recognize the information or for convenience.

The RF module 3335 is connected to the processor 3310 and transmits and/or receives RF signals. The processor 3310 transfers command information to the RF module 3335 so that a radio signal forming voice communication data, for example, is transmitted in order to initiate communication. The RF module 3335 includes a receiver and a transmitter in order to transmit and receive radio signals. The antenna 3340 functions to transmit and receive radio signals. When the RF module 3335 receives a radio signal, it transfers the signal for the processing of the processor 3310 and may convert the signal into a baseband. The processed signal may be converted into audible or readable information through the speaker 3345.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

In this specification, 'A and/or B' can be interpreted to mean 'at least one of A and (or) B.'

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

In the wireless communication system of the present invention, a method for reporting or supporting the number of UEs existing in a geographical area has been described centering on an example applied to a 3GPP LTE/LTE-A/NR (5G) system, but it is possible to apply to various wireless communication systems other than the 3GPP LTE/LTE-A/NR (5G) system.

The invention claimed is:

1. An interworking method between networks of a user equipment (UE) in a wireless communication system, the method comprising:
performing a first interworking procedure for changing a network of the UE from a 5-generation core network (5GC) network to an evolved packet core (EPC) network, wherein, based on an interface between the 5GC and the EPC networks not existing, performing the first interworking procedure includes:
receiving a first indication from an access and mobility management function (AMF) of the 5GC network; and
performing an attach procedure in the EPC network based on the first indication;
performing a second interworking procedure for changing the network of the UE from the EPC network to the 5GC network, wherein, based on the interface between the 5GC and the EPC networks not existing, performing the second interworking procedure includes:
receiving a second indication from a mobility management entity (MME) of the EPC network; and
performing a registration procedure in the 5GC network based on the second indication.

2. The interworking method of claim 1, wherein, based on the interface between the 5GC and the EPC networks existing, the performing of the first interworking procedure includes:
skipping receiving the first indication from the AMF; and
performing a tracking area update (TAU) procedure in the EPC network.

3. The interworking method of claim 2, wherein a packet data unit (PDU) session generated for the UE in the 5GC network is transferred to the EPC network through the attach procedure or the TAU procedure.

4. The interworking method of claim 1, wherein the performing of the attach procedure includes:
transmitting a PDN connectivity request message in which a request type is set to a handover to a mobility management entity (MME) of the EPC network.

5. The interworking method of claim 4, further comprising:
transmitting, to the MME, information indicating that the UE moves from the 5GC network.

6. The interworking method of claim 1, wherein the EPC network has an EPC-'globally unique temporary user equipment identity (GUTI)' mapped with a GUTI of the 5GC network.

7. The interworking method of claim 1, further comprising, based on the interface between the 5GC and the EPC networks not existing and the UE being in a connected mode in the 5GC network:
performing radio resource control (RRC) release with a 'next_generation (NG)'-'radio access network (RAN)' of the 5GC network and camping on a cell connected to the EPC network.

8. The interworking method of claim 1, wherein a packet data unit (PDU) session generated for the UE in the EPC network is transferred to the 5GC network through the registration procedure.

9. The interworking method of claim 1, wherein the registration procedure is a registration procedure in which a registration type is set to a mobility registration update.

10. The interworking method of claim 9, further comprising:
transmitting, to the AMF, information indicating that the UE is moved from the EPC network.

11. The interworking method of claim 9, wherein the 5GC network has a 5GC-'globally unique temporary user equipment identity (GUTI)' mapped with a GUTI of the EPC network.

12. The interworking method of claim 1, further comprising, based on the interface between the 5GC and the EPC networks not existing and the UE being in a connected mode in the EPC network:
performing radio resource control (RRC) release with an evolved-'universal terrestrial radio access network' (E-UTRAN) of the EPC network.

13. A user equipment (UE) for performing an interworking method between networks in a wireless communication system, the user equipment comprising:
a communication module configured to transmit and receive signals; and
a processor configured to control the communication module,
wherein the processor is configured to:
perform a first interworking procedure for changing a network of the UE from a 5-generation core network (5GC) network to an evolved packet core (EPC) network, wherein based on an interface between the 5GC and the EPC networks not existing, performing the first interworking procedure includes:
  receiving a first indication from an access and mobility management function (AMF) of the 5GC network; and
  performing an attach procedure in the EPC network based on the first indication,
performing a second interworking procedure for changing the network of the UE from the EPC network to the 5GC network, wherein, based on the interface between the 5GC and the EPC networks not existing, performing the second interworking procedure includes:
  receiving a second indication from a mobility management entity (MME) of the EPC network; and
  performing a registration procedure in the 5GC network based on the second indication.

14. The UE of claim 13, wherein the processor is further configured to:
  based on the interface between the 5GC and the EPC networks existing, skip receiving the first indication from the AMF; and
  perform a tracking area update (TAU) procedure in the EPC network.

* * * * *